(12) United States Patent
Archetti et al.

(10) Patent No.: US 9,234,135 B2
(45) Date of Patent: Jan. 12, 2016

(54) LIQUID-CRYSTALLINE MEDIUM AND LIQUID-CRYSTAL DISPLAYS

(75) Inventors: Graziano Archetti, Darmstadt (DE); Markus Czanta, Darmstadt (DE)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 13/817,554

(22) PCT Filed: Jul. 21, 2011

(86) PCT No.: PCT/EP2011/003664
§ 371 (c)(1),
(2), (4) Date: Feb. 19, 2013

(87) PCT Pub. No.: WO2012/022417
PCT Pub. Date: Feb. 23, 2012

(65) Prior Publication Data
US 2013/0148069 A1 Jun. 13, 2013

(30) Foreign Application Priority Data
Aug. 19, 2010 (DE) .......................... 10 2010 034 747

(51) Int. Cl.
| | |
|---|---|
| C09K 19/52 | (2006.01) |
| C09K 19/54 | (2006.01) |
| C09K 19/56 | (2006.01) |
| G02F 1/1343 | (2006.01) |
| C09K 19/44 | (2006.01) |
| C09K 19/04 | (2006.01) |
| C09K 19/12 | (2006.01) |
| C09K 19/30 | (2006.01) |

(52) U.S. Cl.
CPC .................. *C09K 19/56* (2013.01); *C09K 19/44* (2013.01); *C09K 19/52* (2013.01); *C09K 19/54* (2013.01); *C09K 19/542* (2013.01); *C09K 19/544* (2013.01); *C09K 2019/0448* (2013.01); *C09K 2019/0466* (2013.01); *C09K 2019/123* (2013.01); *C09K 2019/3004* (2013.01); *C09K 2019/3016* (2013.01); *G02F 1/1343* (2013.01)

(58) Field of Classification Search
CPC .... C09K 19/38; C09K 19/544; C09K 19/548; C09K 19/56; C09K 2019/0448; C09K 19/52; C09K 19/54; C09K 19/542; G02F 1/133742; G02F 1/1343
USPC ................ 252/299.01, 299.4, 299.5; 349/166
See application file for complete search history.

(56) References Cited

U.S. PATENT DOCUMENTS

| | | | | |
|---|---|---|---|---|
| 5,484,867 | A | * | 1/1996 | Lichtenhan et al. .............. 528/9 |
| 6,759,460 | B2 | * | 7/2004 | Kamo et al. .................. 524/100 |
| 7,463,328 | B2 | | 12/2008 | Nakamura |
| 7,550,094 | B2 | | 6/2009 | Jeng et al. |
| 7,719,656 | B2 | | 5/2010 | Nakamura |
| 8,114,310 | B2 | | 2/2012 | Bernatz |
| 2002/0193533 | A1 | | 12/2002 | Hiroshi |
| 2005/0062927 | A1 | | 3/2005 | Nakamura |
| 2005/0224754 | A1 | | 10/2005 | Hirai et al. |
| 2006/0244873 | A1 | | 11/2006 | Nakamura |
| 2007/0045588 | A1 | * | 3/2007 | Tsai et al. |
| 2007/0128379 | A1 | * | 6/2007 | Hirai .............................. 428/1.2 |
| 2008/0198301 | A1 | | 8/2008 | Jeng et al. |
| 2012/0032112 | A1 | | 2/2012 | Czanta et al. |

FOREIGN PATENT DOCUMENTS

| | | |
|---|---|---|
| JP | 2006267514 A | 10/2006 |
| JP | 2009294631 A | 12/2009 |
| JP | 2010163588 A | 7/2010 |
| TW | 201017295 A | 5/2004 |
| TW | 200835954 A | 9/2008 |
| TW | 200930797 A | 7/2009 |
| WO | 2007108154 A1 | 9/2007 |
| WO | 2010/089092 A1 | 8/2010 |

OTHER PUBLICATIONS

International Search Report for PCT/EP2011/003664 (Nov. 15, 2011).
H.K. Shin et al., "Vertical Alignment Nematic Liquid Crystal Cell Controlled by Double-Side In-Plane Switching with Positive Dielectric Anisotropy Liquid Crystal", Journal of Applied Physics, vol. 104 (2008) pp. 084515-1-084515-5.
S.H. Lee et al., "Rubbing-Free, Vertically Aligned Nematic Liquid Crystal Display Controlled by In-Plane Field", Applied Physical Letters, vol. 71, No. 19 (Nov. 10, 1997) pp. 2851-2853.
Translation of Search Report for ROC (Taiwan) patent Application 100129610 completed Apr. 27, 2015.
English translation of JP 2006267514.
English translation of WO 2007108154.
English translation of JP 2010163588.
English translation of 2009294631.

* cited by examiner

*Primary Examiner* — Shean C Wu
(74) *Attorney, Agent, or Firm* — Millen, White, Zelano, Branigan, P.C.

(57) ABSTRACT

The present invention relates to liquid-crystal media and liquid-crystal displays (LC displays) comprising these media with homeotropic (vertical) alignment of the liquid-crystalline medium (LC medium). The LC medium having positive dielectric anisotropy according to the invention comprises particles having a mass of at least 450 Da which have been functionalised by a polar, organic anchor group. It is preferably stabilised by a polymerisable component.

27 Claims, No Drawings

LIQUID-CRYSTALLINE MEDIUM AND LIQUID-CRYSTAL DISPLAYS

The present invention relates to liquid-crystal media and liquid-crystal displays (LC displays) comprising these media with homeotropic (vertical) alignment of the liquid-crystalline medium (LC medium). The LC medium having positive dielectric anisotropy according to the invention comprises particles having a mass of at least 450 Da which have been functionalised by a polar, organic anchor group. It is preferably stabilised by a polymerisable component.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\epsilon \leq -0.5$ in order to be suitable for use in high-information display elements based on the ECB effect. Electro-optical display elements based on the ECB effect have homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

VA displays which comprise LC media having positive dielectric anisotropy are described in S. H. Lee et al. Appl. Phys. Lett. (1997), 71, 2851-2853. These displays use interdigital electrodes arranged on a substrate surface (in-plane control electrode configuration with a comb-shaped structure), as used, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. J. Appl. Phys. (2008), 104, 084515 (DSIPS: 'double-side in-plane switching' for improvements of driver voltage and transmission), M. Jiao et al. App. Phys. Lett (2008), 92, 111101 (DFFS: 'dual fringe field switching' for improved response times) and Y. T. Kim et al. Jap. J. App. Phys. (2009), 48, 110205 (VAS: 'viewing angle switchable' LCD).

In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

An aim of this invention is to simplify the production process itself without giving up the advantages of VA-IPS technology, such as relatively fast response times, good viewing-angle dependence and high contrast.

Industrial application of this effect in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

VA displays are generally intended to have very high specific resistance at the same time as a large working-temperature range, short response times and a low threshold voltage, with the aid of which various grey shades can be produced.

In conventional VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the VA-IPS display. Owing to possible interactions of this type, the number of suitable liquid-crystal components is considerably reduced. It would therefore be desirable to achieve homeotropic alignment of the LC medium without polyimide. At the same time, this would simplify the VA-IPS display production process.

The disadvantage of the TN displays frequently used (TN: 'twisted nematic') is due to their comparatively low contrast, the relatively high viewing-angle dependence and the difficulty of producing grey shades in these displays.

IPS and VA displays have significantly better viewing-angle dependences and are therefore used principally for televisions and monitors.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a pretilt in the cell. In the case of PSA-OCB displays, for example, it is possible for the bend structure to be stabilised so that an offset voltage is unnecessary or can be reduced.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J- Chen et al., Jpn. J. Appl. Phys. 45, 2006, 2702-2704 and S. H. Kim, L.-C- Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221. PSA-VA-IPS displays are described, for example, in WO 2010/089092 A1.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, where both methods are known from the prior art.

In the prior art, polymerisable compounds of the following formula, for example, are used for PSA-VA:

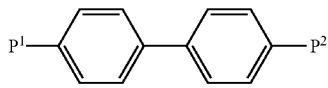

in which P denotes a polymerisable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

Spontaneous horizontal to vertical alignment of a liquid-crystal layer with the aid of nanoparticles based on polyhedral oligomeric silsesquioxanes (simply silsesquioxanes, PSSs below) is reported by the publication Shie-Chang Jeng et al. *Optics Letters* (2009), 34, 455-457. From a concentration of about 1% by weight, virtually homeotropic alignment is observed. The pretilt can only be influenced by the concentration.

The specification US 2008/0198301 A1 (U.S. Pat. No. 7,550,094 B2) likewise proposes PSS as homeotropic alignment material for liquid-crystal media. Application to VA-IPS displays is not disclosed.

The specification JP 2010170090 A discloses a dendrimer as additive to liquid-crystal mixtures which causes vertical alignment with respect to substrates.

Shug-June Hwang et al. J. Phys D: Appl. Phys 2009, 42, 025102 disclose amine-substituted POSS (1%) for the vertical alignment of a dielectrically negative liquid-crystal mixture.

These specifications do not mention the problem of the temperature dependence of the switching operation and the lack of a passivation layer. In fact, it has been shown that the degree of homeotropic alignment induced by PSS decreases rapidly with increasing temperature. In addition, a passivation layer is particularly important since the polyimide layer not only offers alignment of the LC medium, but also ensures electrical insulation. Without a passivation layer, problems may appear with the reliability of the display, such as R-DC ('residual DC').

The existing approaches for achieving display applications without a polyimide layer are therefore still not entirely satisfactory.

The present invention relates to an LC medium comprising a low-molecular-weight liquid-crystalline component having positive dielectric anisotropy with a value $\Delta\epsilon \geq 1.5$ and a component (N) comprising particles having a mass of at least 450 Da, where the particles contain one or more organic polar anchor groups.

An LC medium according to the invention exhibits spontaneous homeotropic (vertical) alignment with respect to a conventional substrate surface, such as, for example, a surface comprising glass or ITO- or polyimide-coated glass.

The LC medium preferably additionally comprises a polymerised or polymerisable component, where the polymerised component is obtainable by polymerisation of a polymerisable component.

The LC medium and in particular its alignment can be stabilised by means of this component and a desired pre-tilt optionally established.

The present invention furthermore relates to a process for the preparation of an LC medium in which a low-molecular-weight liquid-crystalline component having positive dielectric anisotropy with a value $\Delta\epsilon \geq 1.5$ is mixed with a component (N) as described above and below, and one or more polymerisable compounds and/or assistants are optionally added.

The present invention furthermore relates to a liquid-crystal display (LC display) comprising a liquid-crystal cell (LC cell) having two substrates and at least two electrodes, where at least one substrate is transparent to light and at least one substrate has one or two, preferably two, electrodes, and a layer of a liquid-crystal medium (LC medium), located between the substrates, comprising a low-molecular-weight liquid-crystalline component having positive dielectric anisotropy with a value $\Delta\epsilon \geq 1.5$ and a component (N) as defined above and below which is suitable for effecting homeotropic (vertical) alignment of the LC medium with respect to the substrate surfaces.

The LC medium of the LC display preferably comprises a polymerised or polymerisable component, where the polymerised component is obtainable by polymerisation of one or more polymerisable compounds in the LC medium between the substrates of the LC cell, optionally with application of an electrical voltage to the electrodes of the cell.

The invention furthermore relates to a process for the production of an LC display, preferably of the PSA-VA type, comprising an LC cell having two substrates and at least two electrodes, where at least one substrate is transparent to light and preferably at least one substrate has one or two, preferably two, electrodes, comprising the process steps of:
- filling of the cell with an LC medium comprising an LC medium, as described above and below or in the claims, a component (N) which is suitable for effecting homeotropic (vertical) alignment of the LC medium with respect to the substrate surfaces and optionally a polymerisable component, and
- optionally polymerisation of the polymerisable component, optionally with application of a voltage to the electrodes of the cell or under the action of an electric field.

Component (N) is dissolved or dispersed in the liquid crystal. It causes homeotropic alignment of the liquid crystal with respect to the substrate surfaces. It comprises particles having a mass of at least 450 Da, where the particles contain one or more organic polar anchor groups, preferably with a proportion of 50, 75, 90% by weight or more; component (N) particularly preferably consists entirely of such particles. The mass of the particles is preferably 600 Da or more and 2000 Da or less. Component (N) should be chemically inert, ageing-resistant and preferably lipophilic in order to be compatible in contact with LC media and soluble or dispersible. Suitable particles of component (N) are, for example, silsesquioxane compounds containing a polar anchor group, which can be regarded both as chemical compounds and also as nanoparticles having a size of about 1-5 nm. Alternatively, other large moieties which have a molecularly defined structure and contain a polar, organic anchor group can also be used as particles here. Examples of such moieties are, for example, functionalised fullerenes, variants of silsesquioxanes, tetra-substituted methane derivatives and other three-dimensional molecular structures having a mass as defined above. The particles can basically be organic molecules or organic/inorganic hybrid particles. The inorganic part can have a molecularly defined structure (for example PSS) or be an aggregation of atoms (clusters, metal nanoparticles, nanocrystals, etc.).

The particles of component (N) have a diameter greater than or equal to 1 nm, preferably a diameter of 1 to 5 nm. It is preferred for the particles of component (N) to have a side ratio $d_{max}/d_{min}$ of at most 3:1, preferably 2:1 or less. $d_{max}$ here denotes the maximum length dimension and $d_{min}$ denotes the minimum length dimension of a non-spherical particle. In the case of rod-shaped particles, $d_{max}$ denotes the length and $d_{min}$ denotes the width or the smallest diameter. In the case of flake-form particles, $d_{max}$ denotes the diameter and $d_{min}$ denotes the thickness. The greatest length dimension should preferably be 1 nm or more, preferably 1-5 nm. For particles whose structure cannot be described fully, the average diameter is used in the assumption that the particle is approximately spherical. In this case, the average diameter should be used instead of the greatest length dimension. The same applies to statistical size distributions. The size ratios of molecular structures can be estimated with the aid of simple models or calculations of the molecular structure by assuming standard bond angles, bond lengths and van der Waals radii of the atoms involved. The size and shape of other nanoparticulate substances can be determined with adequate accuracy by scattering methods in solution or transmission electron microscopy (TEM).

The particles of component (N) are preferably employed in a concentration of less than 10% by weight, particularly preferably ≤8% by weight and very particularly ≤5% by weight. They are preferably employed in a concentration of at least 0.1% by weight, preferably at least 0.2% by weight. The use of 0.1 to 0.5% by weight of component (N) generally already results in completely homeotropic alignment of the LC layer at the usual cell thicknesses (3 to 4 µm).

The anchor group of component (N) preferably consists of a group which undergoes a non-covalent interaction with the substrate surface comprising glass or metal oxides. Suitable groups are polar groups including groups containing atoms selected from N, O, S and P, which are at the same time preferably stable to air and water. The anchor group preferably contains one or more, preferably two or more, of these heteroatoms.

The anchor group preferably consists of one to two separate structural elements containing heteroatoms selected from N and O and covalent, linking structures between the structural elements and between one or more of the structural elements and the remainder of the particle (=the particle without the anchor group). These covalent structures consist of chain-form or cyclic aliphatic radicals and/or aromatic rings, preferably saturated hydrocarbon chains and/or aliphatic rings. Aliphatic rings include, for example, cyclohexane and cyclopentane. Aromatic rings preferably include benzene, for example 1,4-, 1,3- or 1,2-phenylene.

Besides a hydrocarbon structure, suitable anchor groups therefore contain, as heteroatoms, N and O, such as, for example, in structural elements such as —NH$_2$, —NH— (secondary amine), tert-N (tertiary amine), =N—, —OH, —SH, —CN, —(CO)—, —O—, —S— and combinations of two or more of these groups. Preference is given here to groups which are compatible with the LC displays and the LC medium. Acidic groups, such as —(CO)OH, —S(O)$_2$OH, —P(O)(OH)$_2$, etc., and ionic groups are generally less preferred. A preferred component (N) is characterised in that the compounds or particles of component (N) have been functionalised by an anchor group containing at least one, two or more primary or secondary amine functions (tert-N, —NH—, —NH$_2$), ether groups (—O—) or hydroxyl groups (—OH). There are preferably two or more of these functions in an anchor group. It is preferred here for two heterofunctions to be arranged in such a way with respect to one another that they are able to interact with an atom of a bonding partner in the manner of a bi- or multidentate chelate ligand. In a simple, illustrative case, the type and position of the amino functions correspond to those of ethylenediamine (—NH—CH$_2$CH$_2$—NH$_2$).

In a preferred embodiment, particles of component (N) have the general formula $$O\text{-}A^*,$$

in which
A* denotes the polar anchor group, and
O stands for the remaining particle without the anchor group.

The remaining particle O essentially determines the size of the particle and generally the main proportion (≥90%) of the mass.

The anchor group A* preferably denotes a group of the formula $$\text{-Sp-}[X^2\text{—}Z^2\text{—}]_k X^1 \tag{A1},$$

in which, in each case independently,

Sp denotes a single bond or a spacer group via which a connection to the particle is formed, defined like $Sp^a$, as defined below formula I, preferably a spacer group -Sp"-X"—, as defined for formula I below, which is connected to the particle via the group X", where Sp" very particularly denotes a single bond or an alkylene having 1 to 12 C atoms, $X^1$ denotes a group —$NH_2$, —$NHR^1$, —$NR^1_2$, —CN, —$OR^1$, —OH, —(CO)OH, or a group of the formula

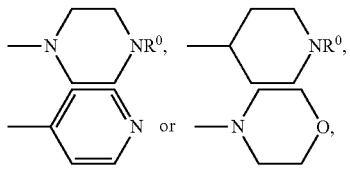

$R^0$ denotes H or alkyl having 1 to 12 C atoms, $X^2$ in each case independently denotes —NH—, —$NR^1$—, —O— or a single bond, $Z^2$ in each case independently denotes an alkylene group having 1-15 C atoms, carbocyclic rings having 5 or 6 C atoms (for example optionally substituted benzene, cyclohexane), or combinations of one or more rings and alkylene groups, in each of which one or more hydrogen atoms are optionally replaced by —OH, $OR^1$, —$NH_2$, —$NHR^1$—, —$NR^1_2$ or halogen (preferably F, Cl), $R^1$ in each case independently denotes a halogenated or unsubstituted alkyl radical having 1 to 15 C atoms, where, in addition, one or more $CH_2$ groups in this radical may each be replaced, independently of one another, by —C≡C—, —CH=CH—, —(CO)O—, —O(CO)—, —(CO)— or —O— in such a way that O and N atoms are not linked directly to one another, and where the groups $R^1$ may optionally be linked to one another to form ring systems, and k denotes 0 to 3.

In particular, the anchor group consists of this radical and denotes A*.

The anchor group of component (N) particularly preferably contains an (N/O)-heteroatom-containing radical of the sub-formula (A2)

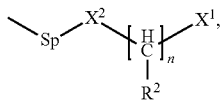 (A2)

in which Sp, $X^1$, $X^2$ and $R^1$ are as defined above for formula (A1), and $R^2$ denotes H, F, Cl, CN, —OH, —$NH_2$, or a halogenated or unsubstituted alkyl radical having 1 to 15 C atoms, where, in addition, one or more $CH_2$ groups in this radical may each be replaced, independently of one another, by —C≡C—, —CH=CH—, —(CO)O—, —O(CO)—, —(CO)—, —O—, —NH— or —$NR^1$— in such a way that O and N atoms are not linked directly to one another, and n denotes 1, 2 or 3.

In particular, the anchor group consists of this radical and denotes A*.

Particularly preferred nitrogen-containing anchor groups A* are selected from

—$NH_2$, —NH—$(CH_2)_{n3}$H, —$(CH_2)_n$—$NH_2$, —$(CH_2)_n$—NH—$(CH_2)_{n3}$H, —NH—$(CH_2)_n$—$NH_2$, —NH—$(CH_2)_n$—NH—$(CH_2)_{n3}$H, —$(CH_2)_{n1}$—NH—$(CH_2)_{n2}$—$NH_2$, —$(CH_2)_{n1}$—NH—$(CH_2)_{n2}$—NH—$(CH_2)_{n3}$H, —O—$(CH_2)_n$—$NH_2$, —$(CH_2)_{n1}$—O—$(CH_2)_n$—$NH_2$, —$(CH_2)_{n1}$—NH—$(CH_2)_{n2}$—OH, —O—$(CH_2)_{n1}$—NH—$(CH_2)_{n2}$—$NH_2$, —O—$(CH_2)_{n1}$—NH—$(CH_2)_{n2}$—OH, —$(CH_2)_{n1}$—NH—$(CH_2)_{n2}$—NH—$(CH_2)_{n3}$H, in which n, n1, n2 and n3 denote, independently, 1, 2, 3, 4, 5, 6, 7, 8, 9, 10, 11 or 12, in particular 1, 2, 3 or 4. The groups containing multiple heteroatoms (N, O) have a particular strength as anchor group. They can be employed in lower concentrations.

Particularly preferred nitrogen-free anchor groups A* are selected from

—OH, —$(CH_2)_n$—OH, —O—$(CH_2)_n$—OH, —[O—$(CH_2)_{n1}$—$]_{n2}$—OH, —(CO)OH, —$(CH_2)_n$—(CO)OH, —O—$(CH_2)_n$—(CO)OH or —[O—$(CH_2)_{n1}$—$]_2$—(CO)OH, in which n, n1 and n2 denote, independently, 1, 2, 3, 4, 5, 6, 7, 8, 9, 10, 11 or 12, in particular 1, 2, 3 or 4. These are very highly compatible with liquid-crystalline media.

The particles used may be identical to or different from one another. They may differ either through the molecular structure or through a statistical mass distribution of a nanoparticle or through isotope distributions.

In general, a particle contains precisely one anchor group. However, a plurality of anchor groups are not excluded. In the case of particles which are joined together by subsequent or prior polymerisation, higher-order particles which contain a plurality of anchor groups arise. Examples of this type are dimers or oligomers of polyhedral silsesquioxanes which have been functionalised by an anchor group on each PSS unit. The combination of a plurality of PSS cores takes place via the organic radicals bonded at the corners. The PSS core can also be broken up and itself contains a plurality of OH groups as anchors (cf. structure PSS-7 below). Preferred particles of component (N) contain one polar anchor group, but are passivated on the surface of the particle by hydrocarbon radicals, preferably by unfunctionalised aliphatic radicals.

Preferred particles which are silsesquioxanes have the general structure PSS-0:

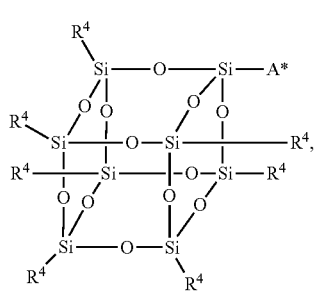

PSS-0 in which

A* denotes an anchor group as described above and below, and $R^4$ in each case, independently, denotes an optionally halogenated hydrocarbon radical, preferably an unfunctionalised or halogenated aliphatic radical, an aromatic radical (in particular benzene radical) or combinations thereof, particularly preferably an alkyl radical or an alkenyl radical, each having up to 15 C atoms, which is optionally mono- or polysubstituted by phenyl and/or halogen.
Particularly preferred particles as component (N) are selected from the following illustrative compounds, which illustrate preferred substituents:
PSS-1
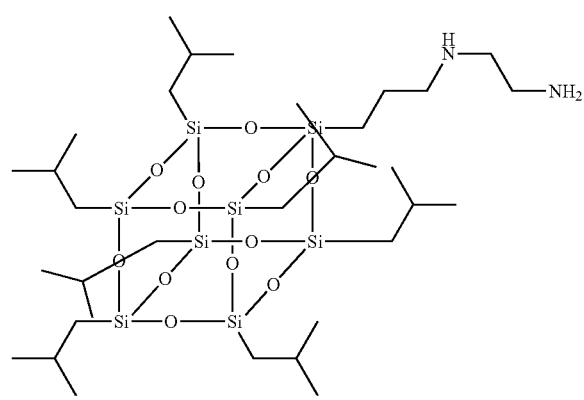
PSS-2
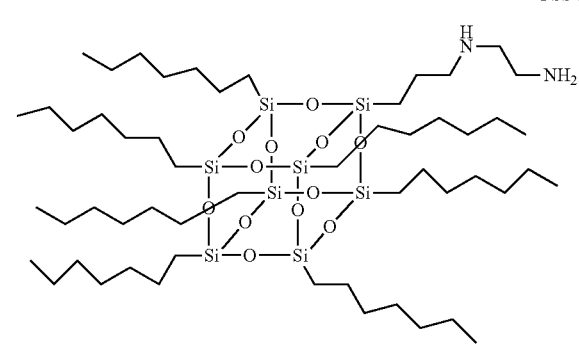
PSS-3
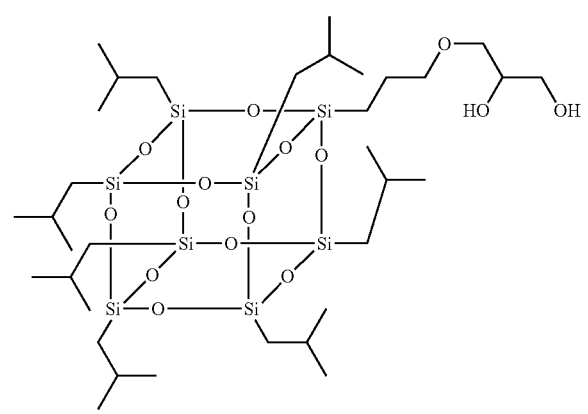
PSS-4
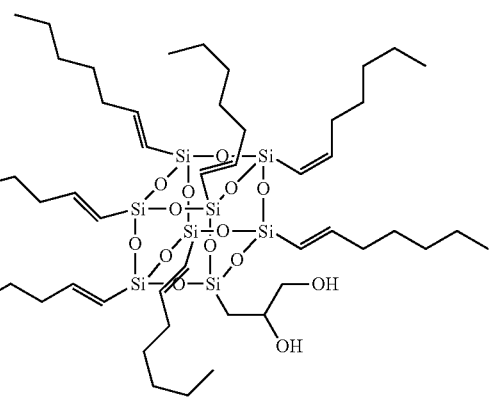
PSS-5
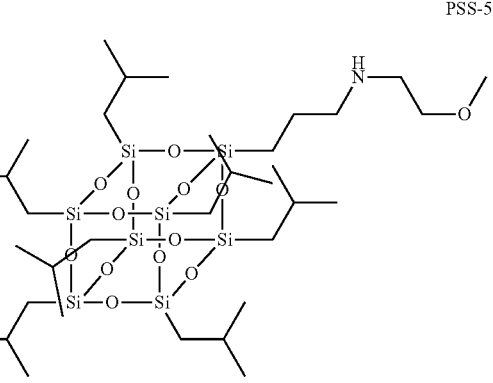
PSS-6
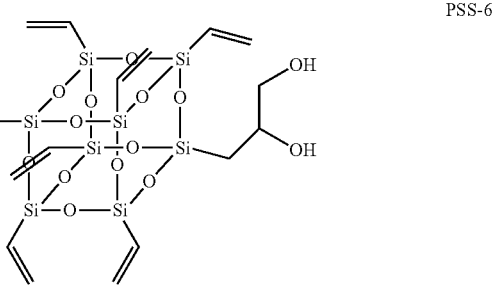
PSS-7
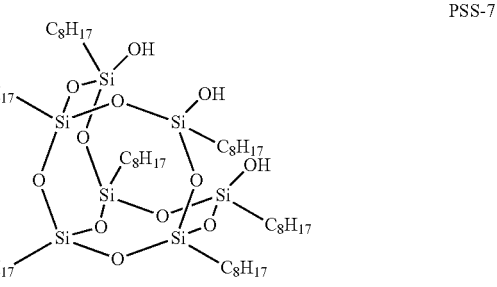

PSS-8

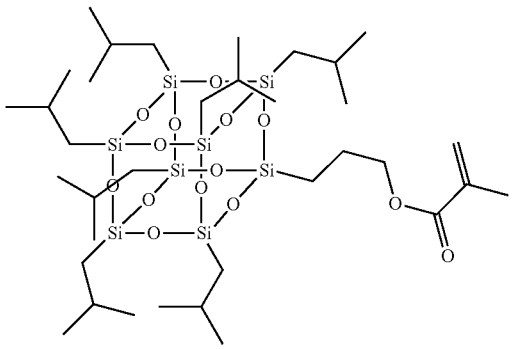

PSS-9

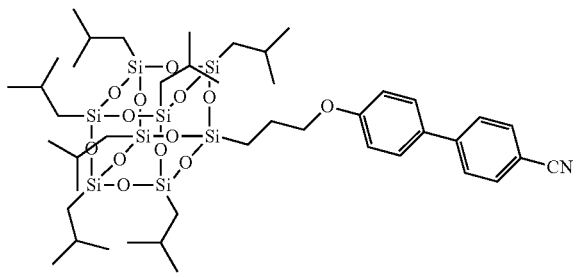

PSS-10

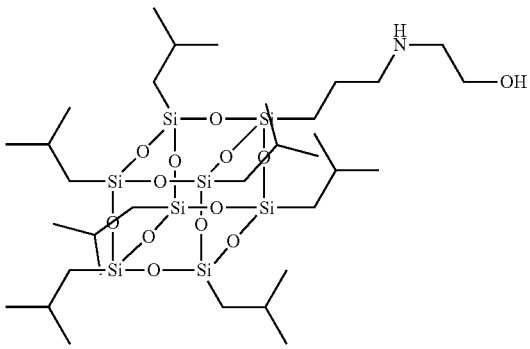

In a further preferred embodiment of the invention, component (N) used comprises particles which, besides the polar anchor, contain one or more polymerisable groups as further functionalisation (compare group $P^a$ or $P^b$ below). Preferred polymerisable groups are groups such as acrylate, methacrylate, fluoroacrylate, oxetane, vinyloxy or epoxide groups, particularly preferably acrylate and methacrylate. The inclusion of component (N) in the polymerisation permanently immobilises the nanoparticles, due to which they retain their function.

An advantage of the LC displays according to the invention is that the display achieves the desired homeotropic alignment without the conventional polyimide alignment layer. Due to polymer stabilisation, this alignment is retained even at high temperatures. Due to the anchor group and the optional polymer stabilisation, improved temperature stability of the electro-optical switching is achieved. The polymer-stabilised displays according to the invention are distinguished by improved response times and a better contrast ratio (pretilt angle and temperature dependence of the contrast). The polymerised component can at the same time serve as a passivation layer, which increases the reliability of the display. The small amount of component (N) has virtually no effect on the properties of the LC media, enabling a wide range of liquid-crystal components to be used in the LC display.

The LC displays according to the invention therefore preferably have no alignment layer for homeotropic alignment on the surfaces of the LC cell.

The LC displays according to the invention use an LC medium having positive dielectric anisotropy ($\Delta\epsilon \geq 1.5$). In general, the display is a VA-IPS display having electrodes arranged on at least one side of the LC cell, preferably having electrodes which are arranged in such a way that they are able to generate an electric field aligned predominantly planar to the substrate surface, for example interdigital electrodes.

The LC displays are provided in a conventional manner with polariser(s), which make(s) the LC medium switching operation visible.

The polymerised component of the LC cell (polymer) is obtainable by polymerisation of a polymerisable component (monomer). In general, the monomers are firstly dissolved in the LC medium and are polymerised in the LC cell after a homeotropic alignment or a high tilt angle of the LC medium has been established. In order to support the desired alignment, a voltage can be applied to the LC cell. In the simplest case, such a voltage is superfluous, and the desired alignment becomes established merely through the nature of the medium and the cell geometry.

Suitable monomers (polymerisable component) for the LC medium are those from the prior art which are used for PSA-VA displays, in particular polymerisable compounds of the formula I mentioned below and/or of the formulae M1 to M29. The LC media according to the invention for use in PSA displays preferably comprise <5% by weight, particularly preferably <1% by weight and very particularly preferably <0.5% by weight, of polymerisable compounds, in particular polymerisable compounds of the formulae mentioned below. In order to achieve an adequate effect, 0.2% by weight or more is preferably employed. The optimum amount is dependent on the layer thickness.

Suitable monomers of the polymerisable component of the LC medium are described by the following formula I:

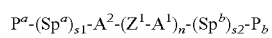

in which the individual radicals have the following meanings:
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
 a) the group consisting of trans-1,4-cyclohexylene, 1,4-cyclohexenylene and 4,4'-bicyclohexylene, in which, in addition, one or more non-adjacent $CH_2$ groups may be replaced by —O— and/or —S— and in which, in addition, one or more H atoms may be replaced by F,
 b) the group consisting of 1,4-phenylene and 1,3-phenylene, in which, in addition, one or two CH groups may be replaced by N and in which, in addition, one or more H atoms may be replaced by L,
 c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
 d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

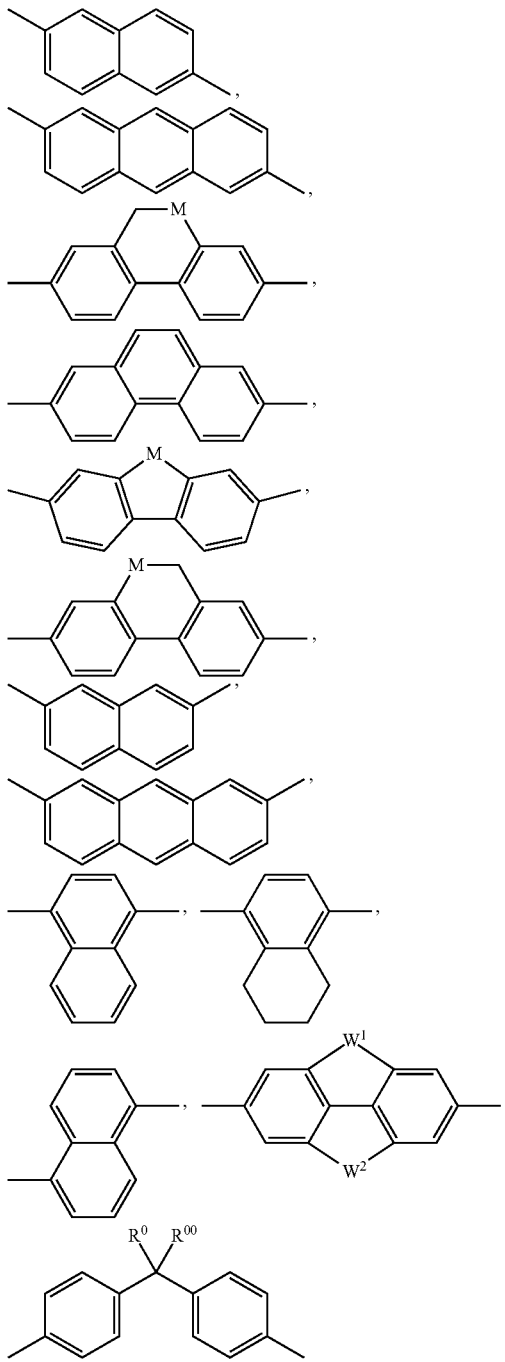

where, in addition, one or more H atoms in these radicals may be replaced by L, and/or one or more double bonds may be replaced by single bonds, and/or one or more CH groups may be replaced by N, n denotes 0, 1, 2 or 3, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^y$R$^z$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN, and preferably H, F, Cl, CN, OCF$_3$ or CF$_3$, $W^1$, $W^2$ each, independently of one another, denote —CH$_2$CH$_2$—, —CH=CH—, —CH$_2$—O—, —O—CH$_2$—, —C(R$^c$R$^d$)— or —O—, $R^c$ and $R^d$ each, independently of one another, denote H or alkyl having 1 to 6 C atoms, preferably H, methyl or ethyl.

The polymerisable group $P^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups $P^{a,b}$ are selected from the group consisting of CH$_2$=CW$^1$—CO—O—, CH$_2$=CW$^1$—CO—, CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{a,b}$ are selected from the group consisting of $CH_2=CW^1-CO-O-$, $CH_2=CW^1-CO-$,

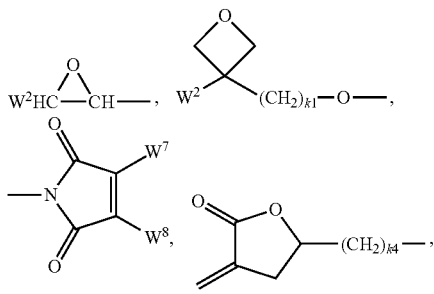

$CH_2=CW^2-O-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH— and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonyl-alkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P^{a,b}$ are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

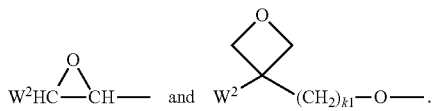

Very particularly preferred groups $P^{a,b}$ are therefore selected from the group consisting of acrylate, methacrylate, fluoroacrylate, furthermore vinyloxy, chloroacrylate, oxetane and epoxide groups, and of these preferably an acrylate or methacrylate group.

Preferred spacer groups $Sp^{a,b}$ are selected from the formula $Sp''-X''$, so that the radical $P^{a/b}-Sp^{a/b}-$ conforms to the formula $P^{a/b}-Sp''-X''-$, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X" is preferably —O—, —S—, —CO—, —COO—, —COO—, —O—COO—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups -Sp"-X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred monomers are the following:

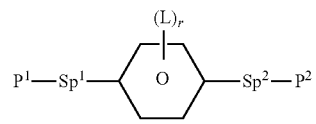

M1

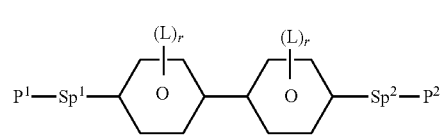

M2

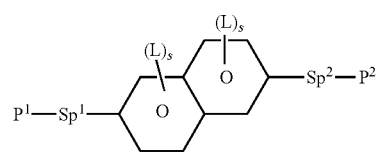

M3

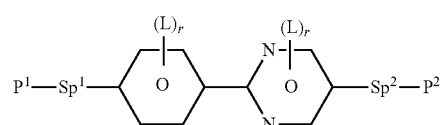

M4

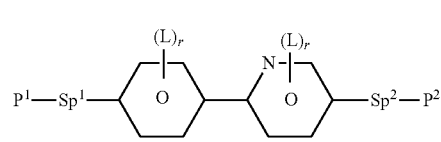

M5

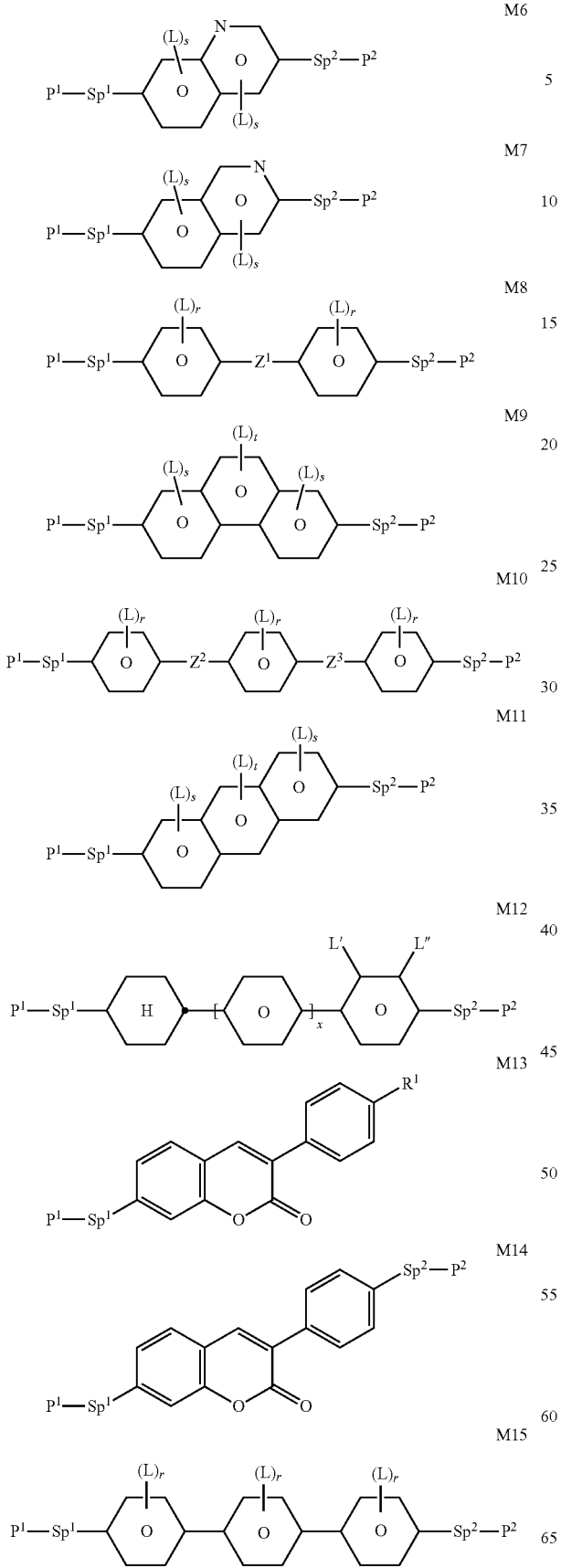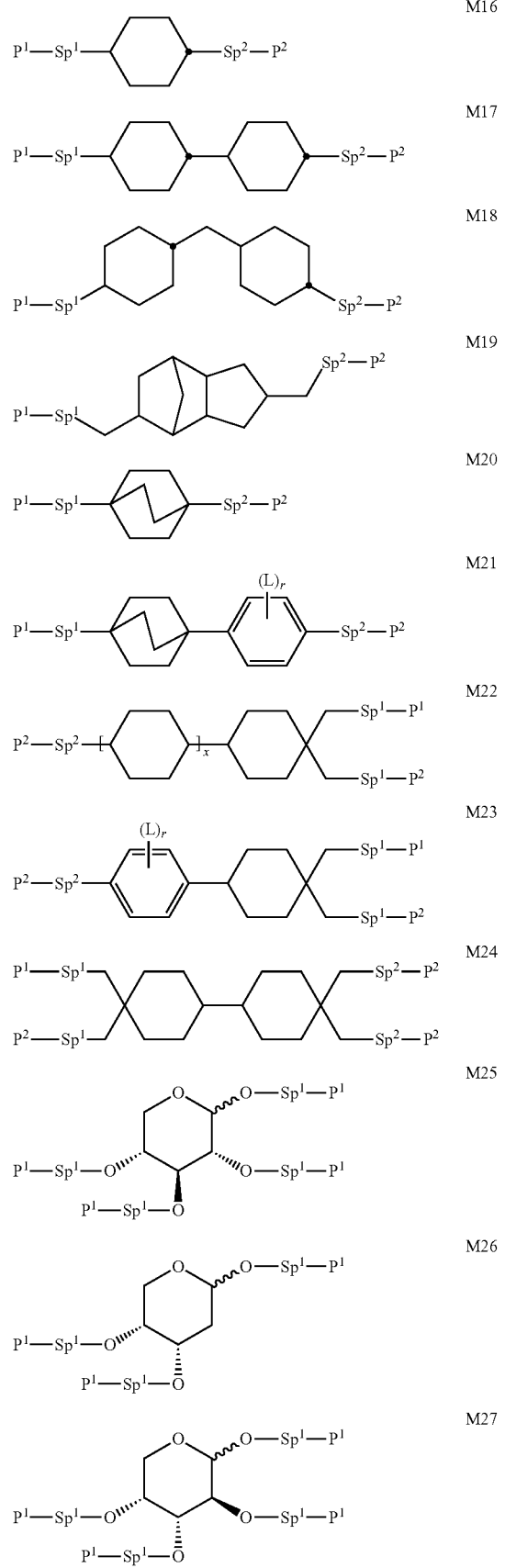

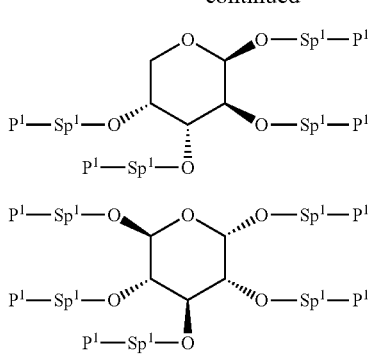

in which the individual radicals have the following meanings:
P¹ and P² each, independently of one another, denote a polymerisable group as defined for formula I, preferably an acrylate, methacrylate, fluoroacrylate, oxetane, vinyloxy or epoxide group, Sp¹ and Sp² each, independently of one another, denote a single bond or a spacer group, preferably having one of the meanings indicated above and below for Sp$^a$, and particularly preferably denote —(CH$_2$)$_{p1}$—, —(CH$_2$)$_{p1}$—O—, —(CH$_2$)$_{p1}$—CO—O— or —(CH$_2$)$_{p1}$—O—CO—O—, in which p1 is an integer from 1 to 12, and where the linking to the adjacent ring in the last-mentioned groups takes place via the O atom, where, in addition, one or more of the radicals P¹-Sp¹- and P²-Sp²- may denote a radical R$^{aa}$, with the proviso that at least one of the radicals P¹-Sp¹- and P²-Sp²- present does not denote R$^{aa}$, R$^{aa}$ denotes H, F, Cl, CN or straight-chain or branched alkyl having 1 to 25 C atoms, in which, in addition, one or more non-adjacent CH$_2$ groups may each be replaced, independently of one another, by C(R⁰)=C(R⁰⁰)—, —C≡C—, —N(R⁰)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), R⁰, R⁰⁰ each, independently of one another, denote H or alkyl having 1 to 12 C atoms, R$^y$ and R$^z$ each, independently of one another, denote H, F, CH$_3$ or CF$_3$, Z¹ denotes —O—, —CO—, —C(R$^y$R$^z$)— or —CF$_2$CF$_2$—, Z² and Z³ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN, SCN, SF$_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4,
s denotes 0, 1, 2 or 3,
t denotes 0, 1 or 2, and
x denotes 0 or 1.

The LC medium or the polymerisable component preferably comprises one or more compounds selected from the group of the formulae M1-M21, particularly preferably from the group of the formulae M2-M9 and very particularly preferably from the group of the formulae M2, M16, M17 and M18.

The LC medium or the polymerisable component preferably comprises no compounds of the formula M10 in which Z² and Z³ denote —(CO)O— or —O(CO)—.

For the production of PSA displays, the polymerisable compounds are polymerised or crosslinked (if a polymerisable compound contains two or more polymerisable groups) by in-situ polymerisation in the LC medium between the substrates of the LC display, optionally with application of a voltage. The polymerisation can be carried out in one step. It is also possible firstly to carry out the polymerisation with application of a voltage in a first step in order to produce a pretilt angle, and subsequently, in a second polymerisation step, to polymerise or crosslink the compounds which have not fully reacted in the first step without an applied voltage ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of the RMs or the polymerisable component, is preferably 10-10,000 ppm, particularly preferably 50-500 ppm.

Besides the polymerisable compounds described above and component (N), the LC media for use in the LC displays according to the invention comprise an LC mixture ("host mixture") comprising one or more, preferably two or more, low-molecular-weight (i.e. monomeric or unpolymerised) compounds. The latter are stable or unreactive with respect to a polymerisation reaction under the conditions used for the polymerisation of the polymerisable compounds. In principle, a suitable host mixture is any dielectrically positive LC mixture which is suitable for use in conventional TN, IPS, FFS and VA-IPS displays.

Suitable LC mixtures having positive dielectric anisotropy which are suitable for LCDs and especially for IPS displays are known, for example, from JP 07-181 439 (A), EP 0 667

555, EP 0 673 986, DE 195 09 410, DE 195 28 106, DE 195 28 107, WO 96/23 851 and WO 96/28 521.

Preferred embodiments of the liquid-crystalline medium according to the invention are indicated below:

LC medium which additionally comprises one or more compounds of the formulae II and/or III:

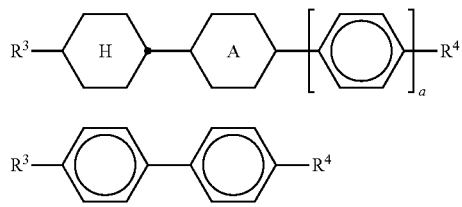

in which ring A denotes 1,4-phenylene or trans-1,4-cyclohexylene, a is 0 or 1,

R³ in each case, independently of one another, denotes alkyl having 1 to 9 C atoms or alkenyl having 2 to 9 C atoms, preferably alkenyl having 2 to 9 C atoms, and R⁴ in each case, independently of one another, denotes an unsubstituted or halogenated alkyl radical having 1 to 12 C atoms, where, in addition, one or two non-adjacent CH₂ groups may be replaced by —O—, —CH=CH—, —CH=CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

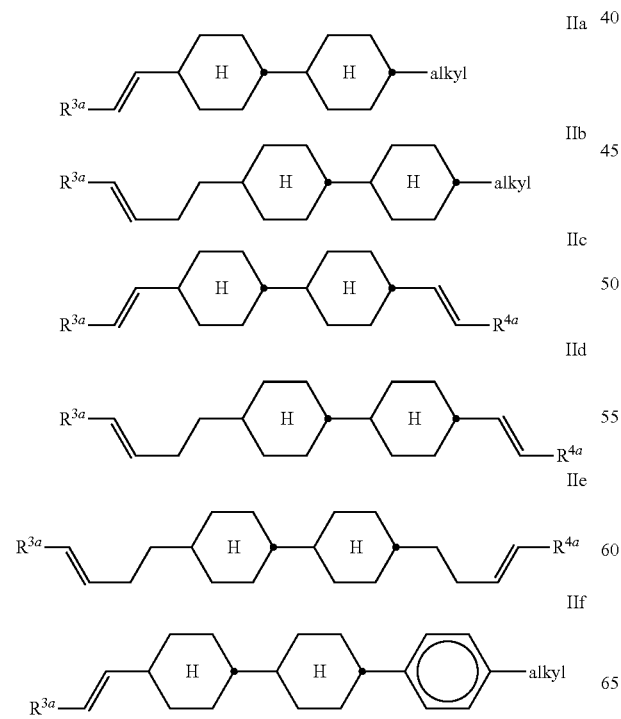

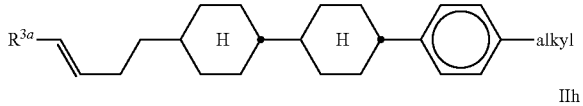

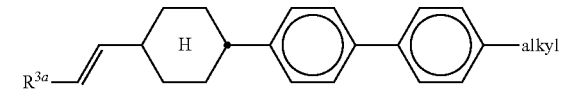

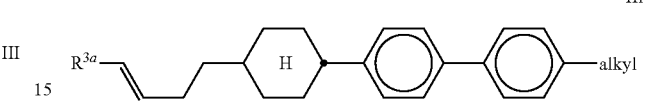

in which $R^{3a}$ and $R^{4a}$ each, independently of one another, denote H, CH₃, C₂H₅ or C₃H₇, and "alkyl" denotes a straight-chain alkyl group having 1 to 8, preferably 1, 2, 3, 4 or 5, C atoms. Particular preference is given to compounds of the formulae IIa and IIf, in particular those in which $R^{3a}$ denotes H or CH₃, preferably H, and compounds of the formula IIc, in particular those in which $R^{3a}$ and $R^{4a}$ denote H, CH₃ or C₂H₅.

The compounds of the formula III are preferably selected from the group consisting of the following formulae:

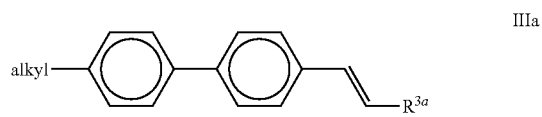

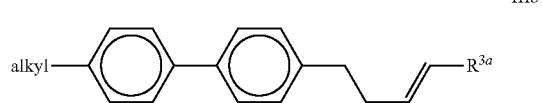

in which "alkyl" and $R^{3a}$ have the meanings indicated above, and $R^{3a}$ preferably denotes H or CH₃. Particular preference is given to compounds of the formula IIIb;

LC medium which additionally comprises one or more compounds selected from the group consisting of the following formulae:

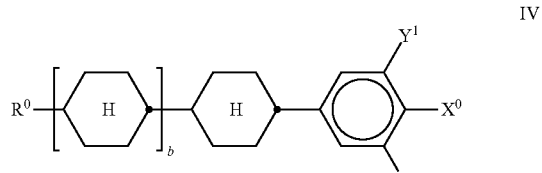

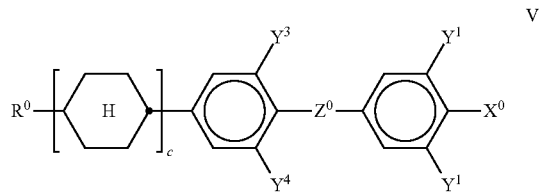

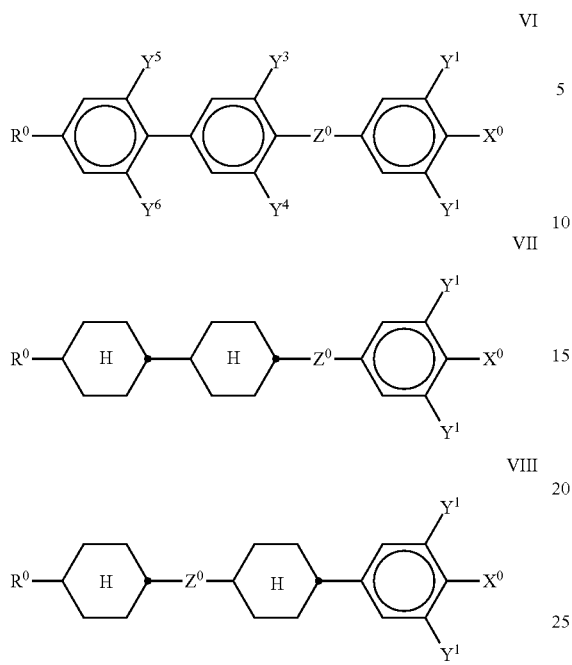

in which

R⁰ denotes an alkyl or alkoxy radical having 1 to 15 C atoms, where, in addition, one or more CH₂ groups in these radicals may each be replaced, independently of one another, by —C≡C—, —CF₂O—, —CH=CH—,

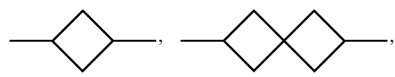

—O—, —(CO)O— or —O(CO)—in such a way that O atoms are not linked directly to one another, and in which, in addition, one or more H atoms may be replaced by halogen, X⁰ denotes F, Cl, CN, SF₅, SCN, NCS, a halogenated alkyl radical, halogenated alkenyl radical, halogenated alkoxy radical or halogenated alkenyloxy radical, each having up to 6 C atoms, Y¹⁻⁶ each, independently of one another, denote H or F, Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO—, —CF₂O— or —OCF₂—, in the formulae V and VI also a single bond, and b and c each, independently of one another, denote 0 or 1.

In the compounds of the formulae IV to VIII, X⁰ preferably denotes F or OCF₃, furthermore OCHF₂, CF₃, CF₂H, Cl, OCH=CF₂. R⁰ is preferably straight-chain alkyl or alkenyl, each having up to 6 C atoms.

The compounds of the formula IV are preferably selected from the group consisting of the following formulae:

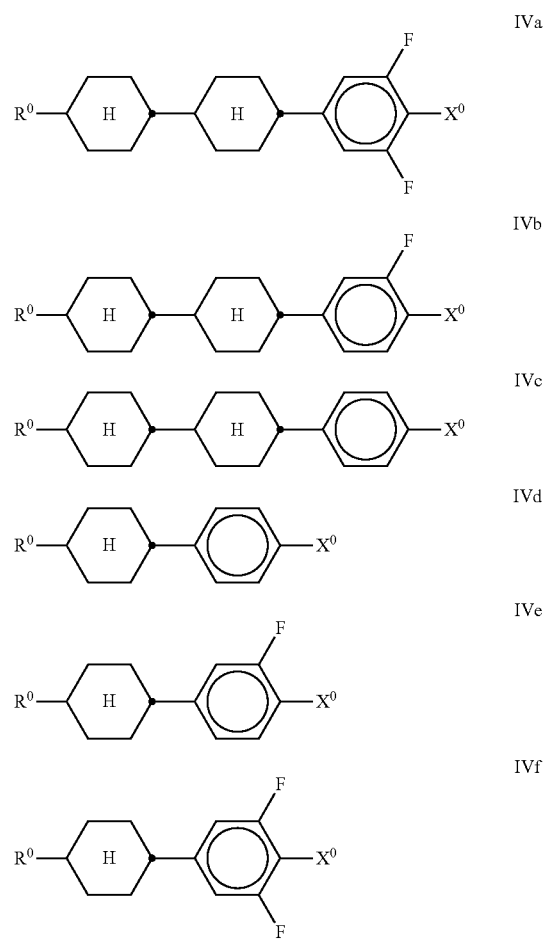

in which R⁰ and X⁰ have the meanings indicated above.

In formula IV, R⁰ preferably denotes alkyl having 1 to 8 C atoms and X⁰ preferably denotes F, Cl, OCH F₂ or OCF₃, furthermore OCH=CF₂. In the compound of the formula IVb, R⁰ preferably denotes alkyl or alkenyl. In the compound of the formula IVd, X⁰ preferably denotes Cl, furthermore F.

The compounds of the formula V are preferably selected from the group consisting of the following formulae:

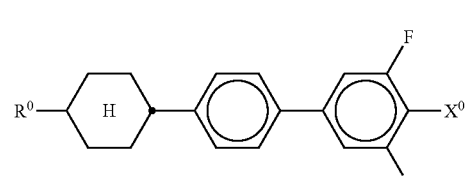

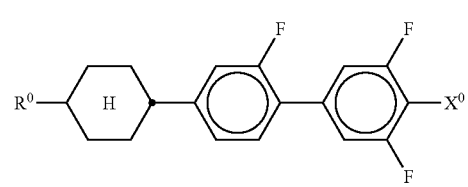

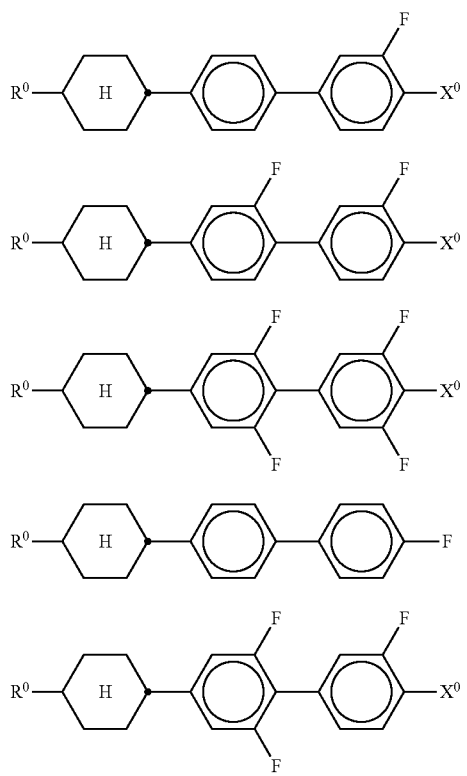

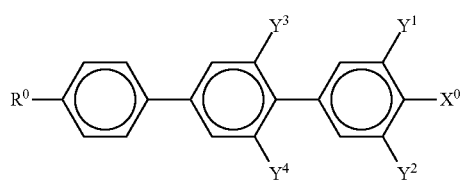

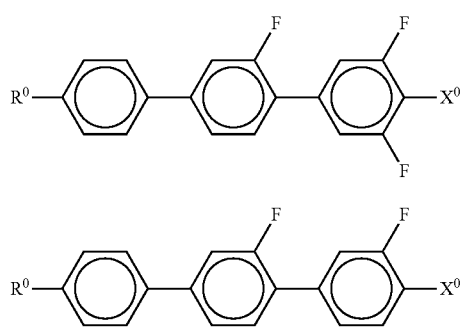

in which $R^0$ and $X^0$ have the meanings indicated above. In formula V, $R^0$ preferably denotes alkyl having 1 to 8 C atoms and $X^0$ preferably denotes F;

LC medium which comprises one or more compounds of the formula VI-1.

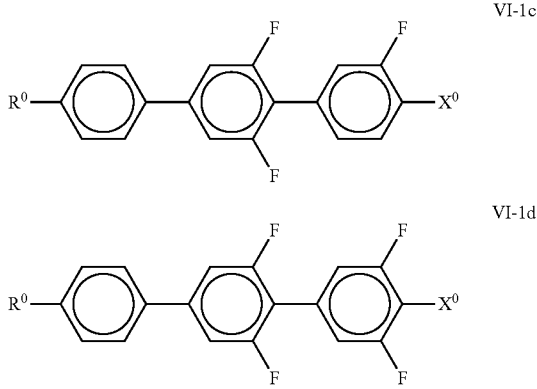

particularly preferably those selected from the group consisting of the following formulae:

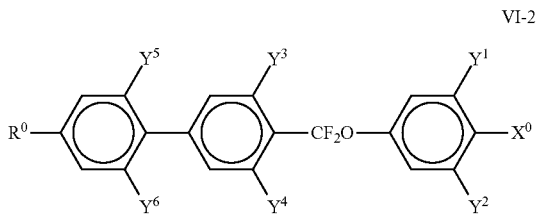

in which $R^0$ and $X^0$ have the meanings indicated above. In formula VI, $R^0$ preferably denotes alkyl having 1 to 8 C atoms and $X^0$ preferably denotes F, furthermore $OCF_3$.

LC medium which comprises one or more compounds of the formula VI-2:

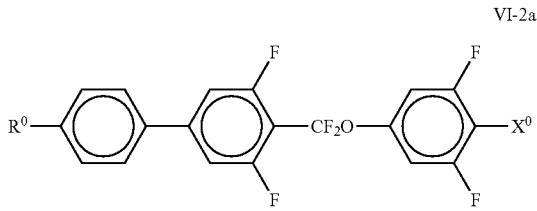

particularly preferably those selected from the group consisting of the following formulae:

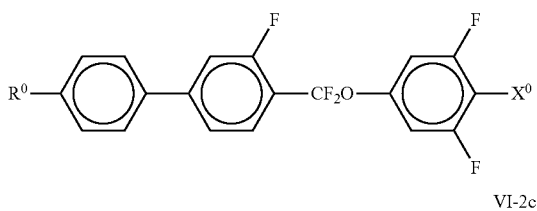

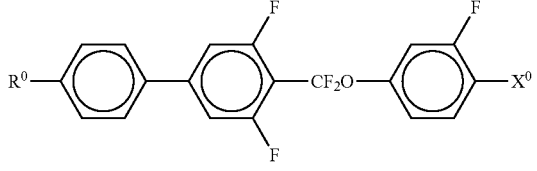

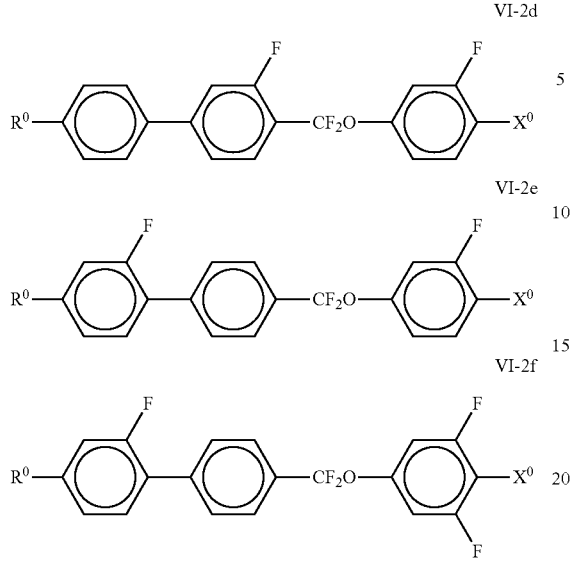

VI-2d

VI-2e

VI-2f in which R⁰ and X⁰ have the meanings indicated above.

In formula VI, R⁰ preferably denotes alkyl having 1 to 8 C atoms and X⁰ preferably denotes F;

LC medium which preferably comprises one or more compounds of the formula VII in which Z⁰ denotes —CF₂O—, —CH₂CH₂— or —(CO)O—, particularly preferably those selected from the group consisting of the following formulae:

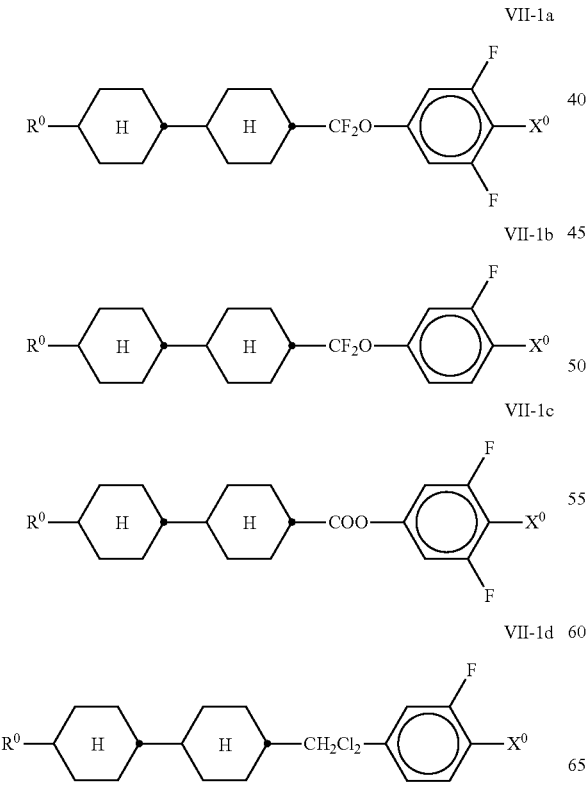

VII-1a

VII-1b

VII-1c

VII-1d

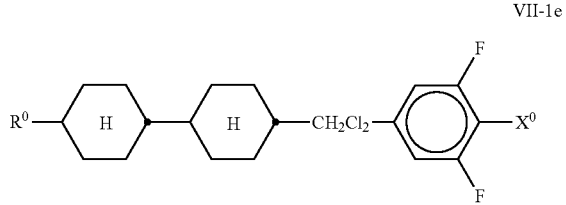

VII-1e in which R⁰ and X⁰ have the meanings indicated above. In formula VII, R⁰ preferably denotes alkyl having 1 to 8 C atoms and X⁰ preferably denotes F, furthermore OCF₃.

The compounds of the formula VIII are preferably selected from the group consisting of the following formulae:

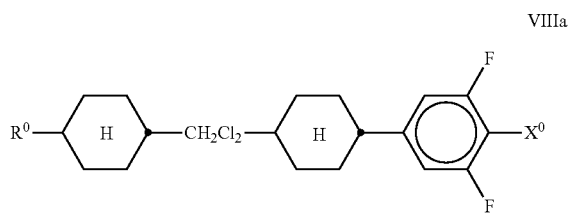

VIIIa

VIIIb

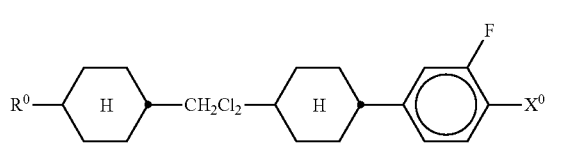

VIIIc

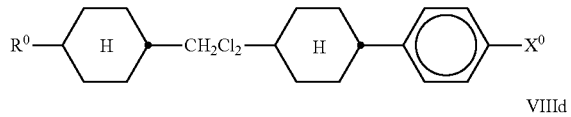

VIIId

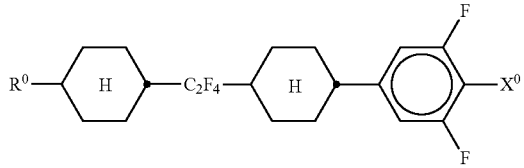

VIIIe

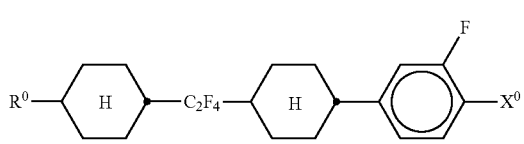

VIIIf

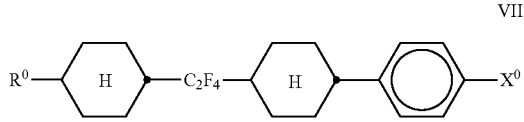

in which R⁰ and X⁰ have the meanings indicated above. R⁰ preferably denotes a straight-chain alkyl radical having 1 to 8 C atoms. X⁰ preferably denotes F.

LC medium which additionally comprises one or more compounds of the following formula:

IX

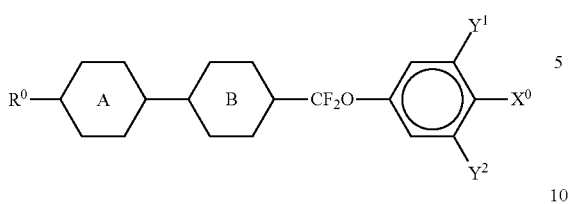

in which $R^0$, $X^0$, $Y^1$ and $Y^2$ have the meanings indicated above, and

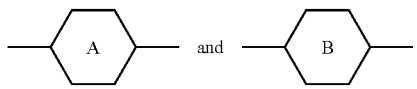

each, independently of one another, denote

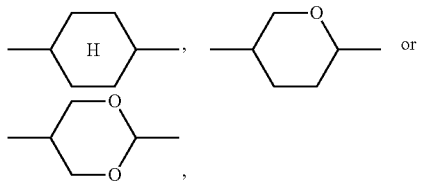 or where the rings A and B do not both simultaneously denote cyclohexylene;

The compounds of the formula IX are preferably selected from the group consisting of the following formulae:

IXa

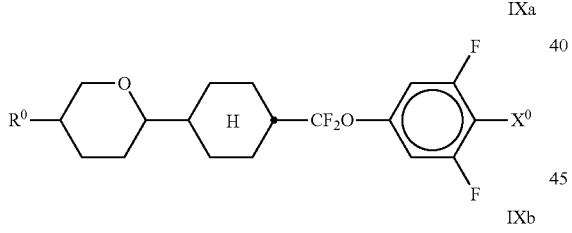

IXb

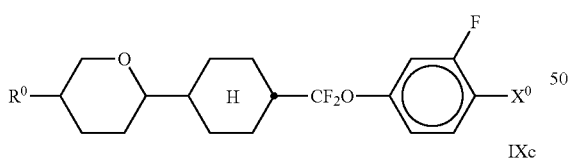

IXc

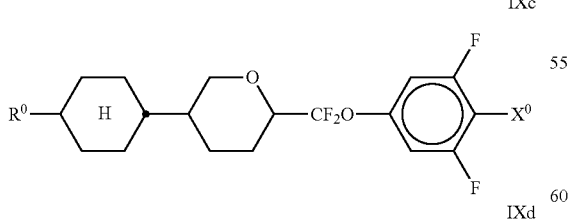

IXd

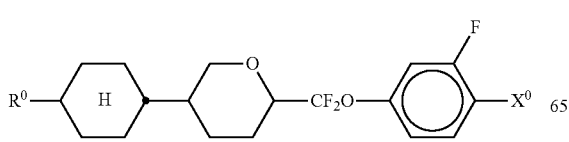

IXe

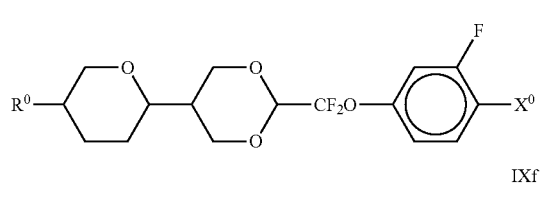

IXf

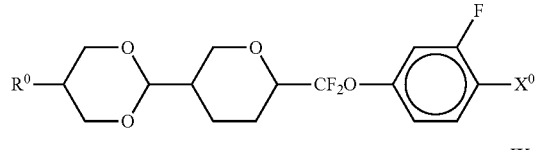

IXg

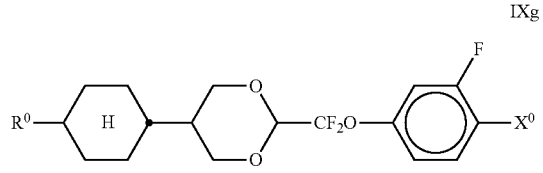

IXh

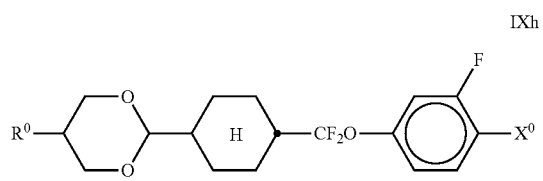

in which $R^0$ and $X^0$ have the meanings indicated above. $R^0$ preferably denotes alkyl having 1 to 8 C atoms and $X^0$ preferably denotes F. Particular preference is given to compounds of the formula IXa;

LC medium which additionally comprises one or more compounds selected from the group consisting of the following formulae:

X

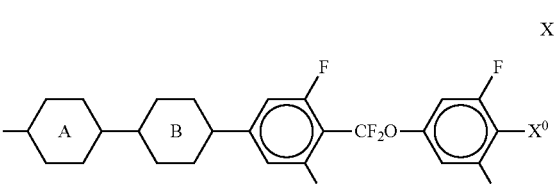

XI

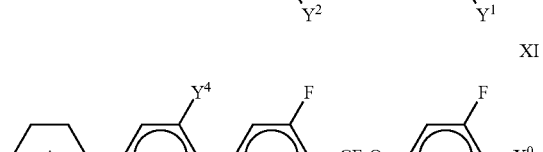

in which $R^0$, $X^0$ and $Y^{1-4}$ have the meanings indicated above, and

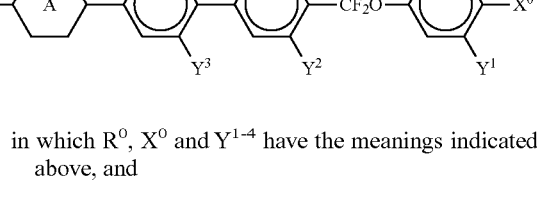

each, independently of one another, denote

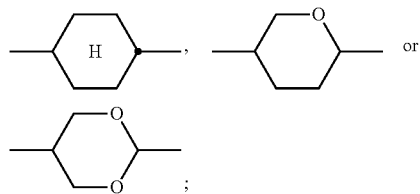

The compounds of the formulae X and XI are preferably selected from the group consisting of the following formulae:

Xa
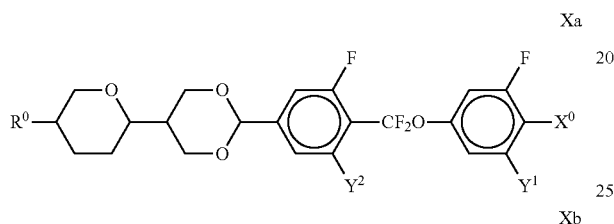

Xb
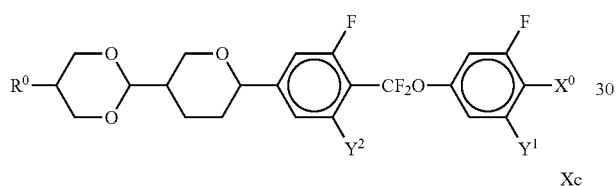

Xc
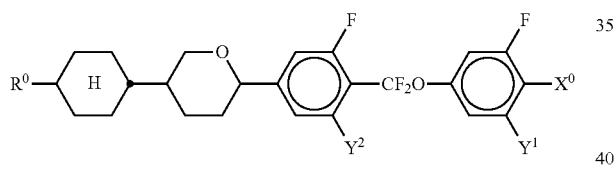

Xd
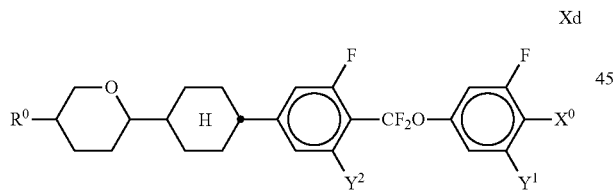

Xe
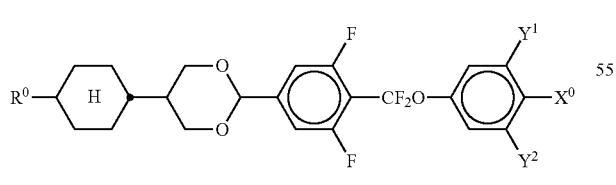

Xf
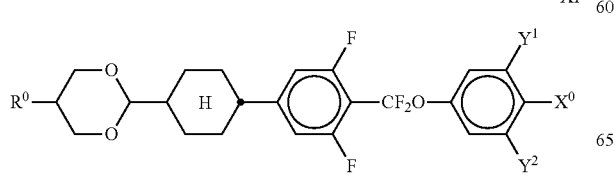

XIa
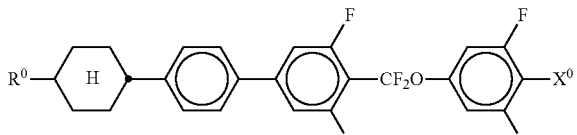

XIb
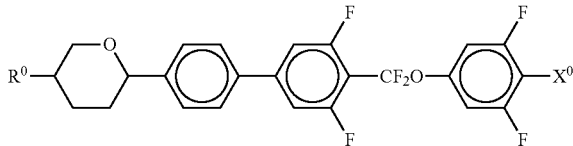
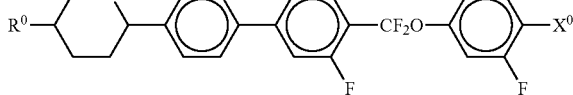

in which $R^0$ and $X^0$ have the meanings indicated above. $R^0$ preferably denotes alkyl having 1 to 8 C atoms and/or $X^0$ preferably denotes F. Particularly preferred compounds are those in which $Y^1$ denotes F and $Y^2$ denotes H or F, preferably F;

LC medium which additionally comprises one or more compounds of the following formula XII:

XII
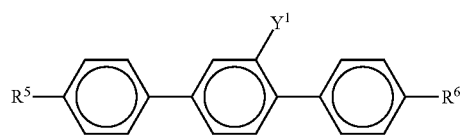

in which $R^5$ and $R^6$ each, independently of one another, denote n-alkyl, alkoxy, oxaalkyl, fluoroalkyl or alkenyl, each having up to 9 C atoms, and preferably each, independently of one another, denote alkyl having 1 to 7 C atoms or alkenyl having 2 to 7 C atoms. $Y^1$ denotes H or F.

Preferred compounds of the formula XII are those selected from the group consisting of the following formulae:

XIIa
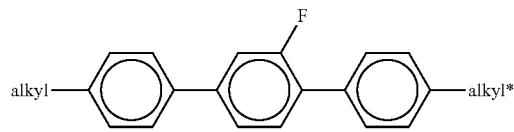

XIIb
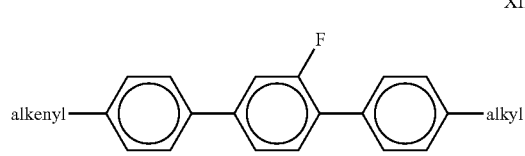

XIIc
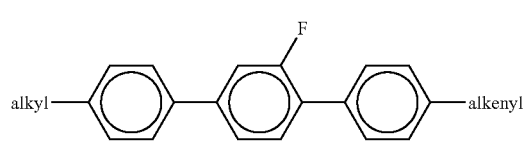

-continued

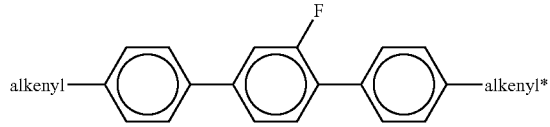
XIId in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

Very particular preference is given to compounds of the following formula:

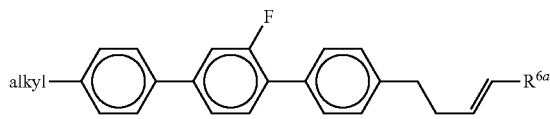
XIIc1 in which alkyl has the meaning indicated above, and $R^{6a}$ denotes H or $CH_3$.

LC medium which additionally comprises one or more compounds selected from the group consisting of the following formulae:

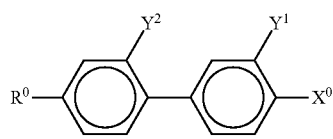
XIII

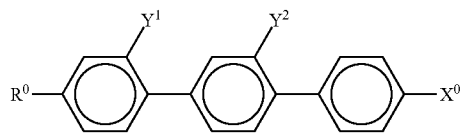
XIV

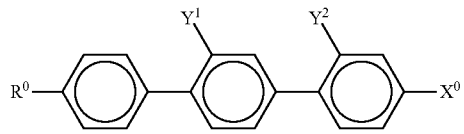
XV

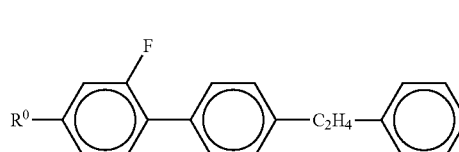
XVI in which $R^0$, $X^0$, $Y^1$ and $Y^2$ have the meanings indicated above. $R^0$ preferably denotes alkyl having 1 to 8 C atoms and $X^0$ preferably denotes F or Cl;

The compounds of the formulae XIII and XIV are preferably selected from the group consisting of the following formulae:

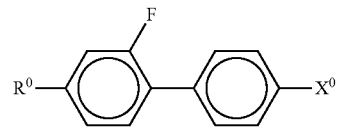
XIIIa

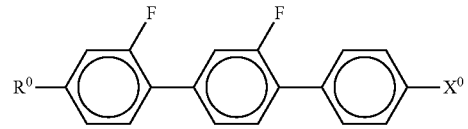
XIVa

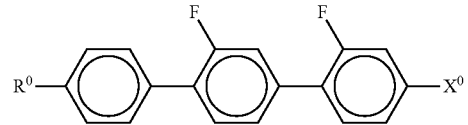
XVa in which $R^0$ and $X^0$ have the meanings indicated above. $R^0$ preferably denotes alkyl having 1 to 8 C atoms. In the compounds of the formula XIII, $X^0$ preferably denotes F or Cl.

LC medium which additionally comprises one or more compounds of the formulae D1 and/or D2:

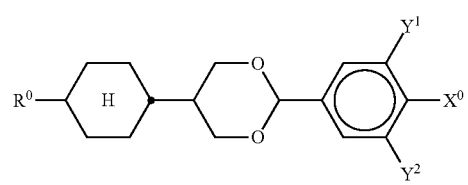
D1

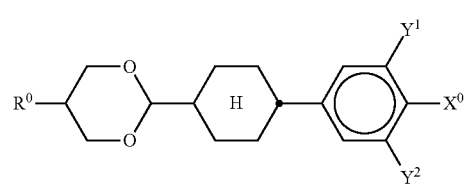
D2 in which $Y^1$, $Y^2$, $R^0$ and $X^0$ have the meanings indicated above. $R^0$ preferably denotes alkyl having 1 to 8 C atoms and $X^0$ preferably denotes F. Particular preference is given to compounds of the following formulae:

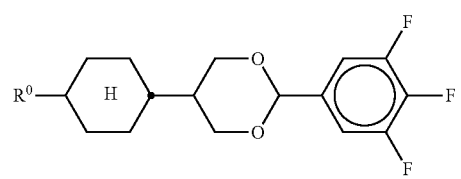
D1-1

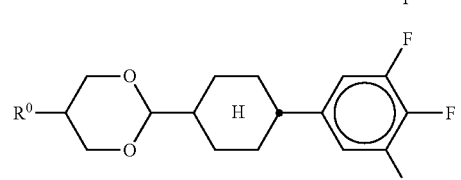
D2-1 in which $R^0$ has the meaning indicated above and preferably denotes straight-chain alkyl having 1 to 6 C atoms, in particular $C_2H_5$, n-$C_3H_7$ or n-$C_5H_{11}$.

LC medium which additionally comprises one or more compounds of the following formulae:

XVIIa

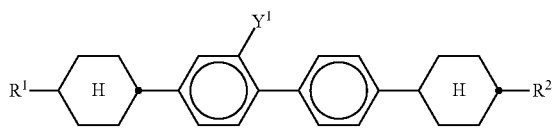

XVIIb

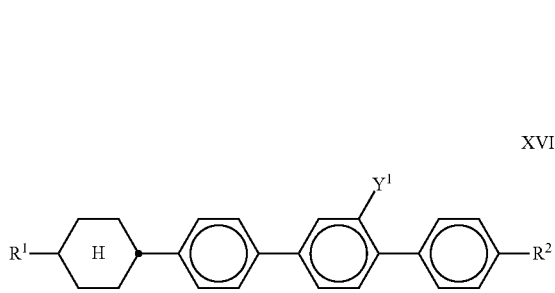

in which $Y^1$, $R^1$ and $R^2$ have the meanings indicated above. $R^1$ and $R^2$ preferably each, independently of one another, denote alkyl having 1 to 8 C atoms. $Y^1$ preferably denotes F. Preferred media comprise 1-15% by weight, in particular 1-10% by weight, of these compounds.

LC medium which additionally comprises one or more compounds of the following formula:

XVIII

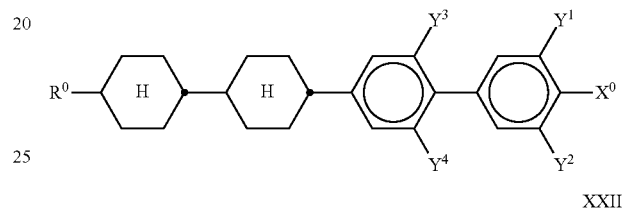

in which $X^0$, $Y^1$ and $Y^2$ have the meanings indicated above, and "alkenyl" denotes $C_{2-7}$-alkenyl. Particular preference is given to compounds of the following formula:

XVIIIa

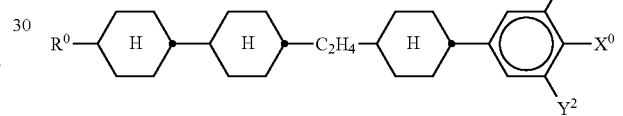

in which $R^{3a}$ has the meaning indicated above and preferably denotes H;

LC medium which additionally comprises one or more tetracyclic compounds selected from the group consisting of the formulae XIX to XXV:

XIX

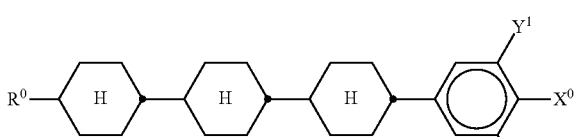

XX

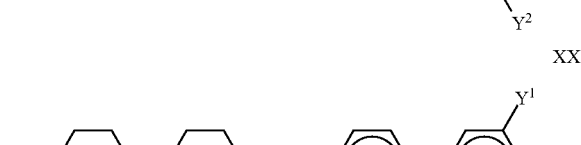

XXI

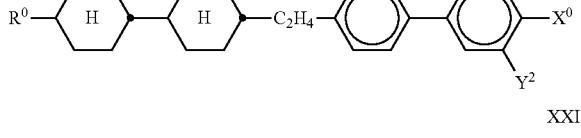

XXII

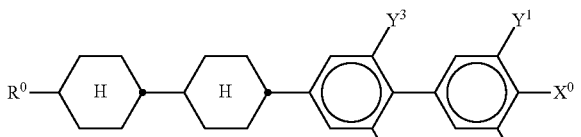

XXIII

XXIV

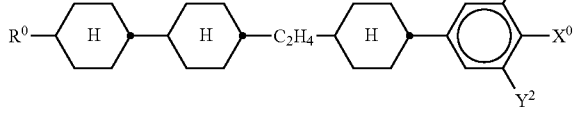

XXV

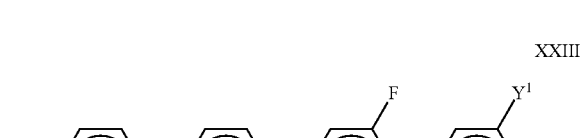

in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

LC medium which additionally comprises one or more compounds of the following formula:

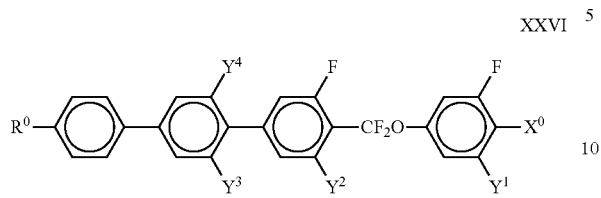

XXVI in which $R^0$, $X^0$ and $Y^{1-4}$ have the meanings indicated above. Particular preference is given to compounds of the following formula:

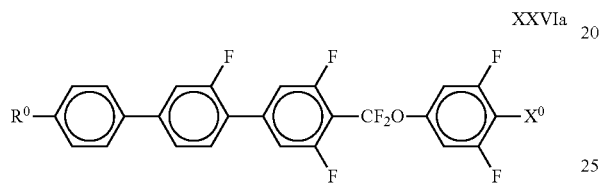

XXVIa

LC medium which additionally comprises one or more compounds of the following formula:

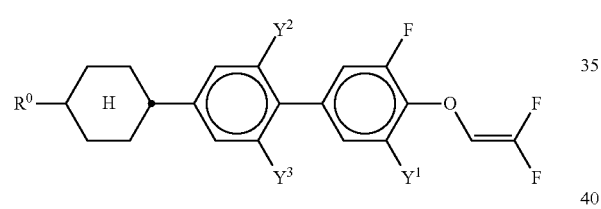

XXVII in which $R^0$ and $Y^{1-3}$ have the meanings indicated above. Particular preference is given to compounds of the following formulae:

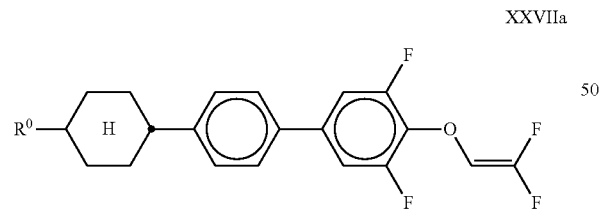

XXVIIa

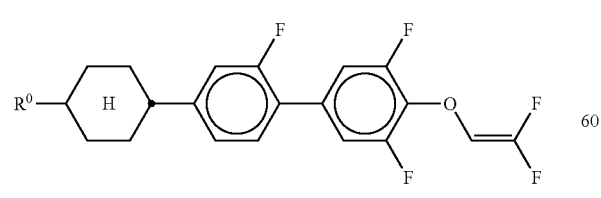

XXVIIb in which $R^0$ has the meaning indicated above and preferably denotes alkyl, alkoxy, oxaalkyl, fluoroalkyl or alkenyl, each having up to 8 C atoms.

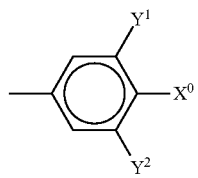

is preferably

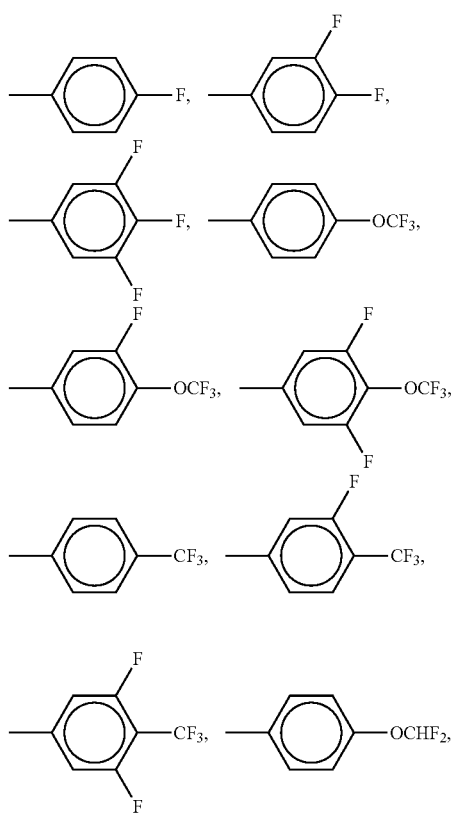

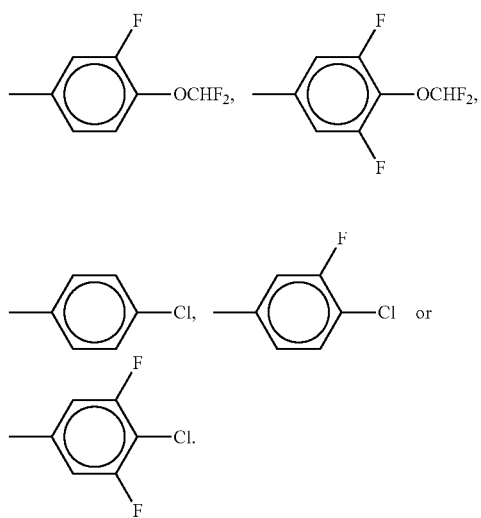

$R^0$ is generally preferably straight-chain alkyl or alkenyl having 2 to 7 C atoms;

$X^0$ is preferably F, furthermore $OCF_3$, Cl or $CF_3$;

the medium preferably comprises one or more compounds selected from the group of the compounds of the formula II;

the medium preferably comprises one or more compounds selected from the group of the compounds of the formulae VI-2, VII-1a, VII-1b, IX, X, XI and XXVI ($CF_2O$-bridged compounds); the total content of compounds of the formulae VI-2, VII-1a, VII-1b, IX, X, XI and XXVI is preferably 35% by weight or more, particularly preferably 40% by weight or more and very particularly preferably 45% by weight or more;

the proportion of compounds of the formulae II-XXVII in the mixture as a whole is preferably 20 to 99% by weight;

the medium preferably comprises 25-80% by weight, particularly preferably 30-70% by weight, of compounds of the formulae II and/or III;

the medium preferably comprises 20-70% by weight, particularly preferably 25-60% by weight, of compounds of the formula IIa;

the medium preferably comprises 2-25% by weight, particularly preferably 3-20% by weight, of compounds selected from the group of the compounds of the formula VI-2;

the medium comprises in total 2-30% by weight, particularly preferably 3-20% by weight, of compounds of the formulae XI and XXVI together;

the medium preferably comprises 1-20% by weight, particularly preferably 2-15% by weight, of compounds of the formula XXIV;

the medium comprises in total 15-65% by weight, particularly preferably 30-55% by weight, of compounds selected from the high-polarity compounds of the formulae VI-2, X, XI and XXV together.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

Preferred mixture components are found in Tables A and B.

TABLE A

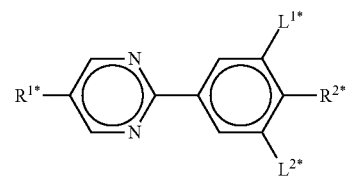

PYP

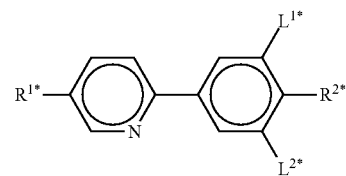

PYRP

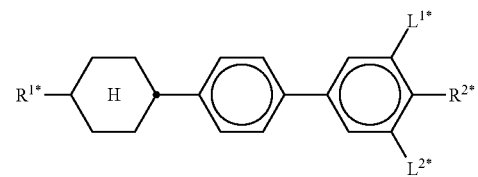

BCH

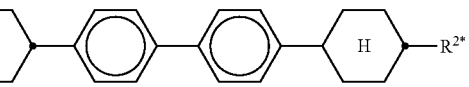

CBC

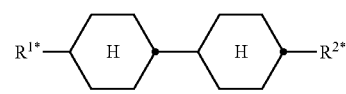

CCH

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| $nOCF_3$ | $C_nH_{2n+1}$ | $OCF_3$ | H | H |
| $nOCF_3$.F | $C_nH_{2n+1}$ | $OCF_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

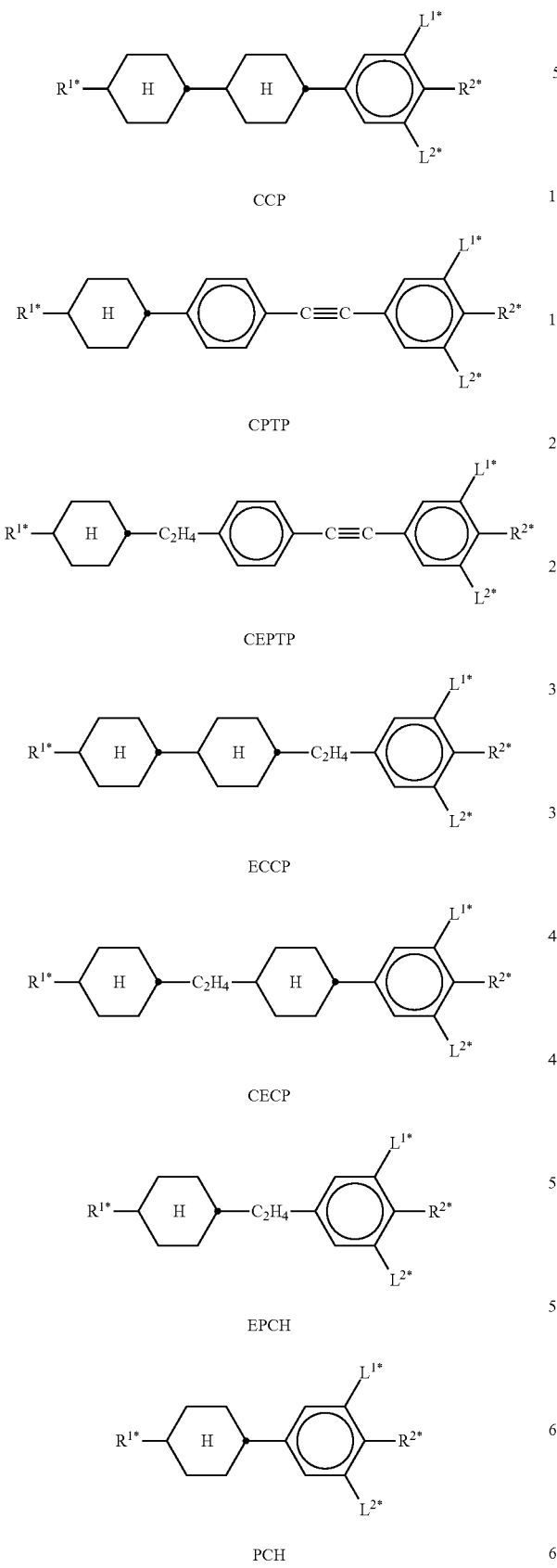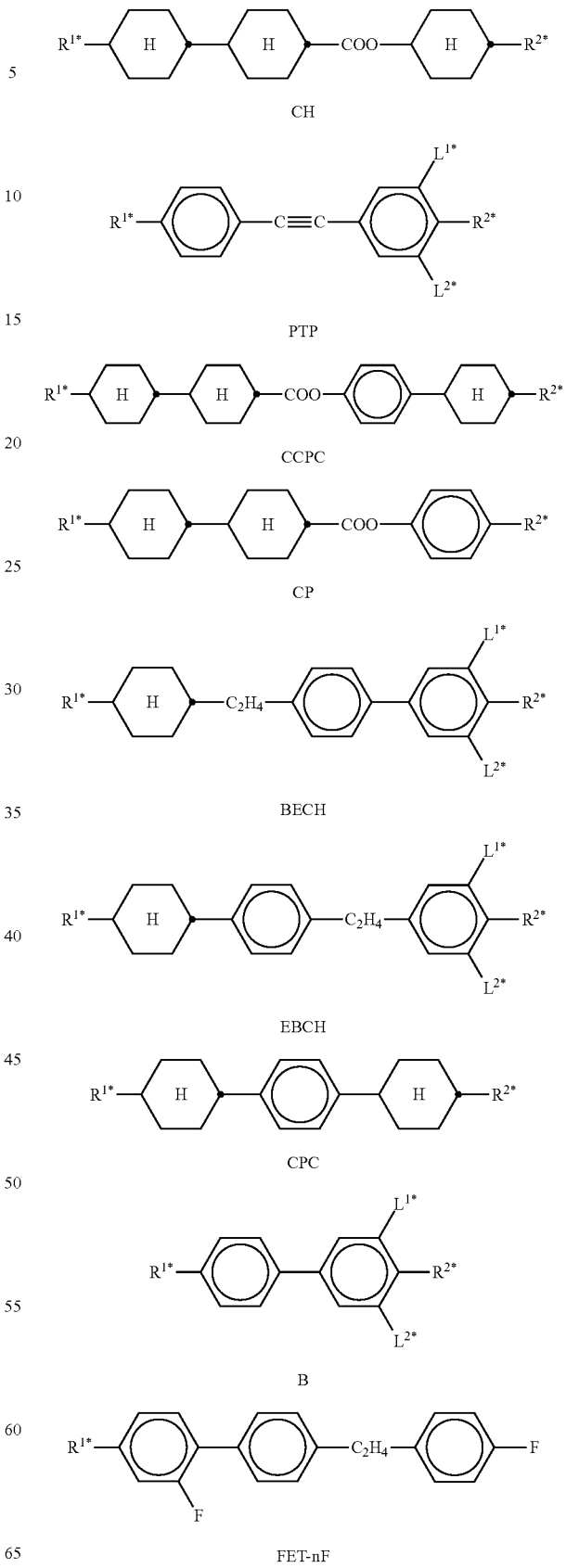

TABLE A-continued
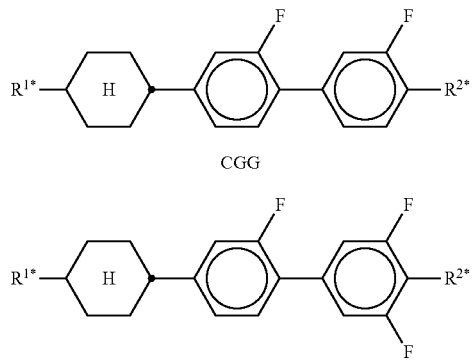
CGG
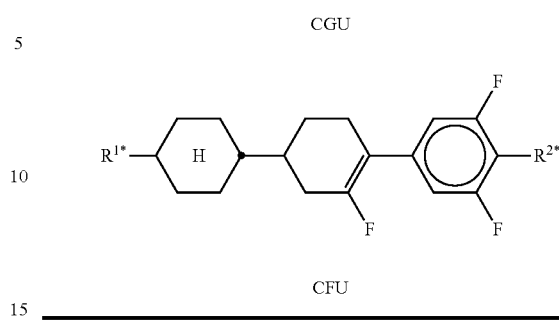
CGU
CFU
TABLE B
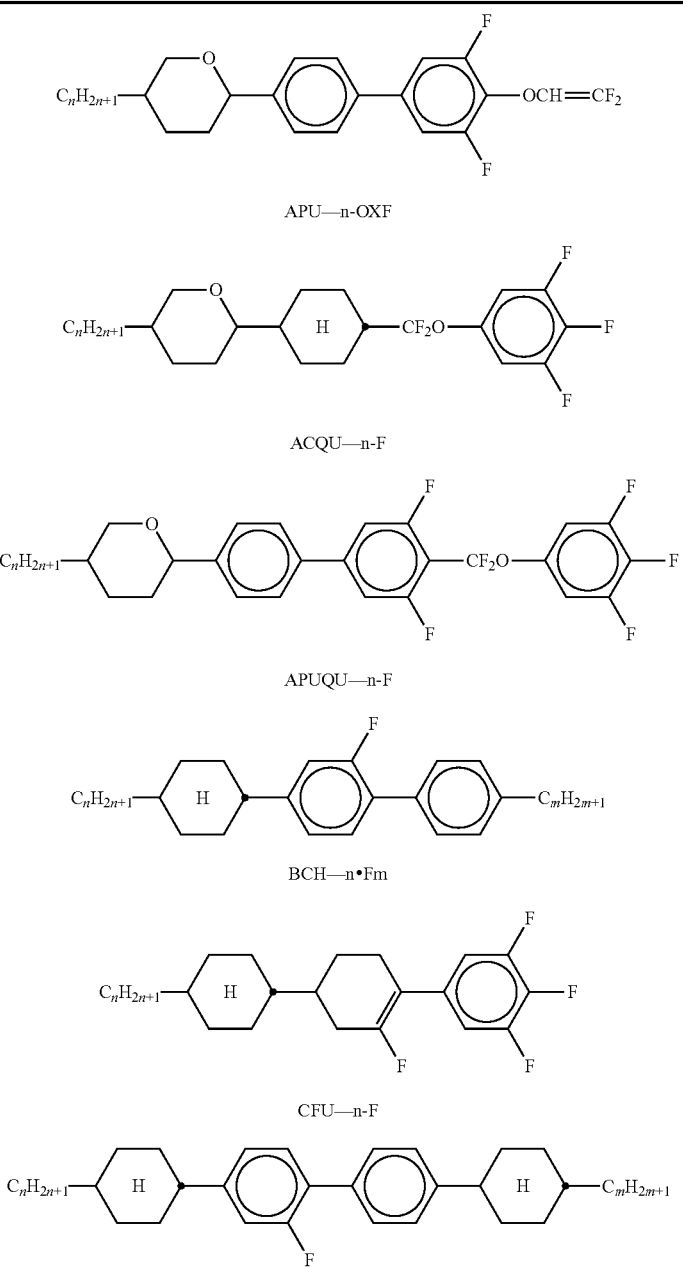
APU—n-OXF
ACQU—n-F
APUQU—n-F
BCH—n•Fm
CFU—n-F TABLE B-continued
CBC-nmF
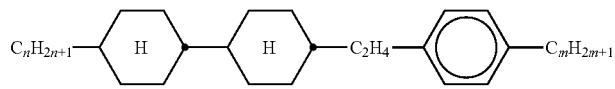
ECCP-nm
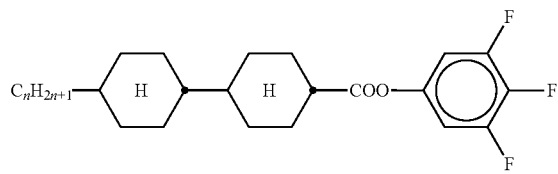
CCZU—n-F
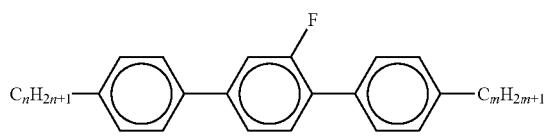
PGP-n-m
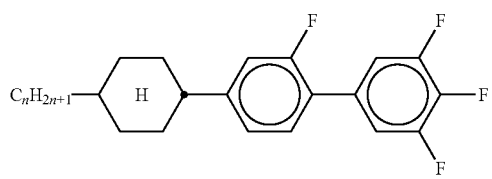
CGU—n-F
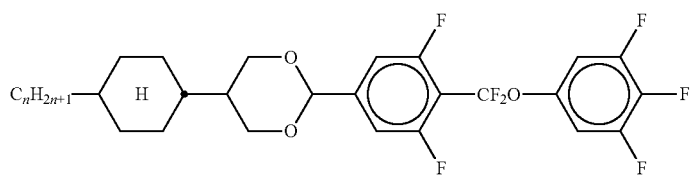
CDUQU—n-F
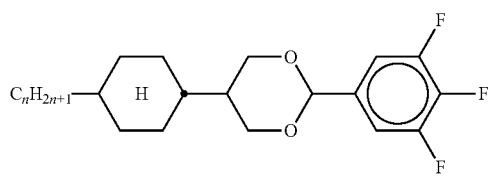
CDU—n-F
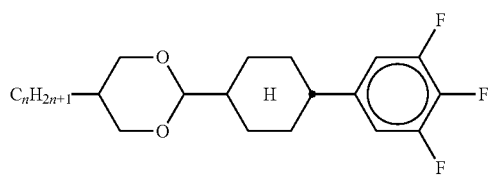
DCU—n-F
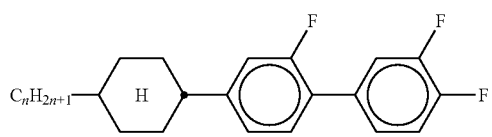

TABLE B-continued
CGG—n-F
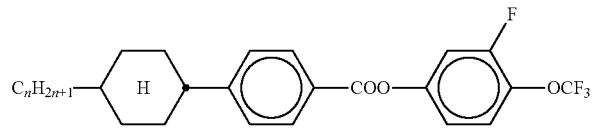
CPZG—n-OT
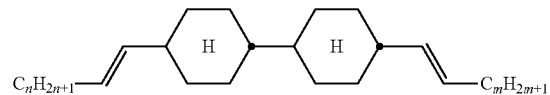
CC-nV—Vm
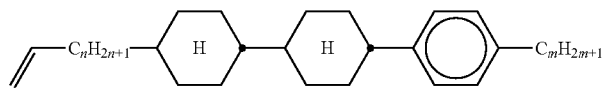
CCP—Vn-m
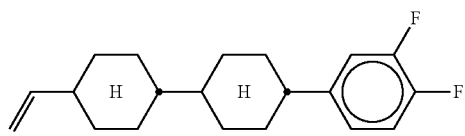
CCG—V—F
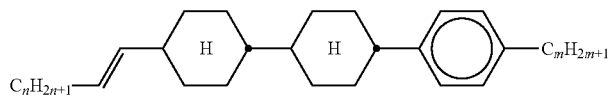
CCP-nV-m
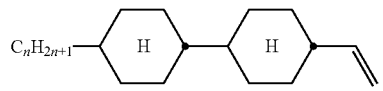
CC—n-V
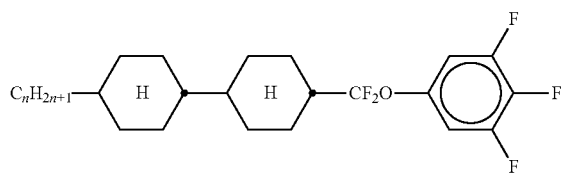
CCQU—n-F
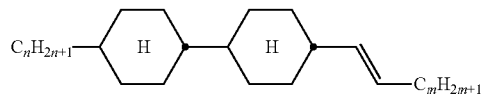
CC—n-Vm
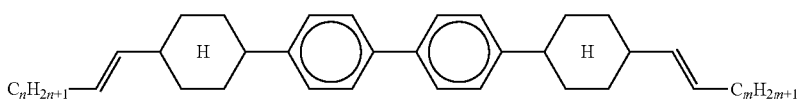
CPPC-nV—Vm
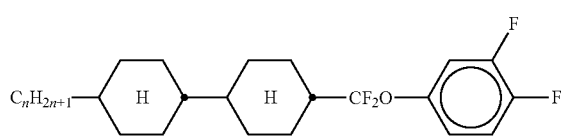

TABLE B-continued
CCQG—n-F
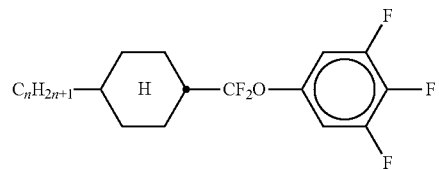
CQU—n-F
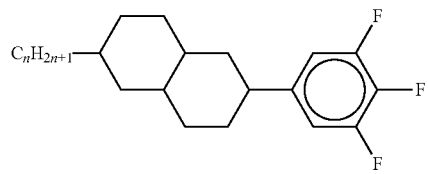
Dec-U—n-F
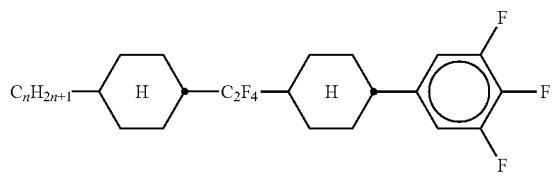
CWCU—n-F
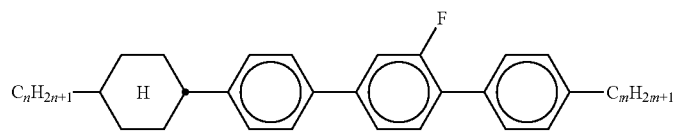
CPGP-n-m
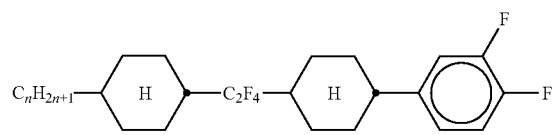
CWCG—n-F
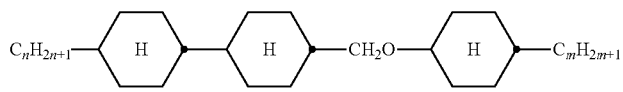
CCOC-n-m
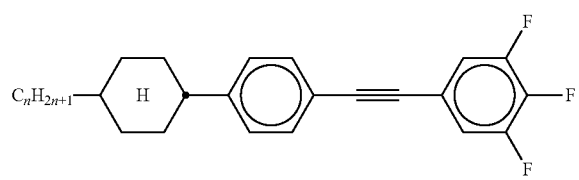
CPTU—n-F
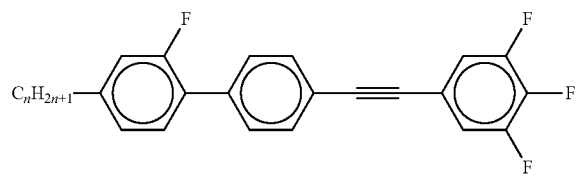

TABLE B-continued
GPTU—n-F
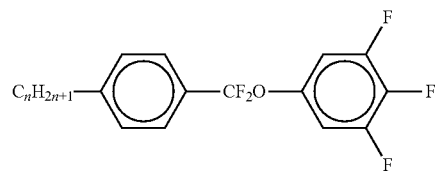
PQU—n-F
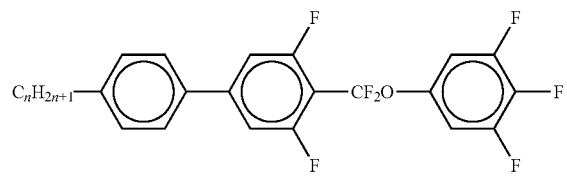
PUQU—n-F
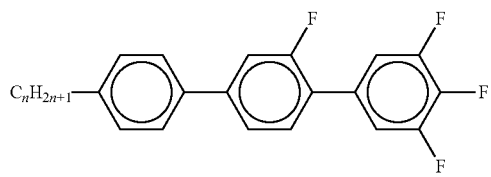
PGU—n-F
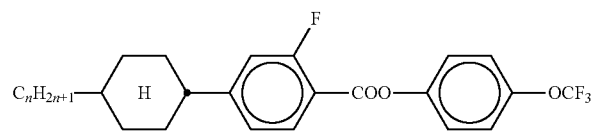
CGZP—n-OT
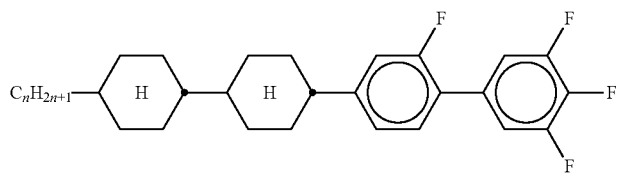
CCGU—n-F
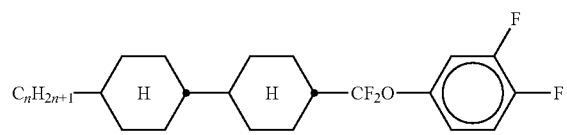
CCQG—n-F
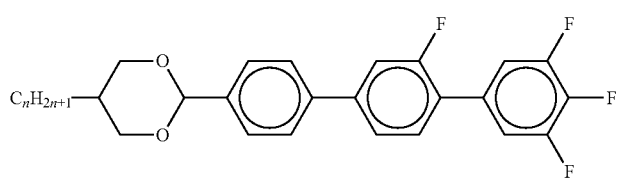
DPGU—n-F TABLE B-continued
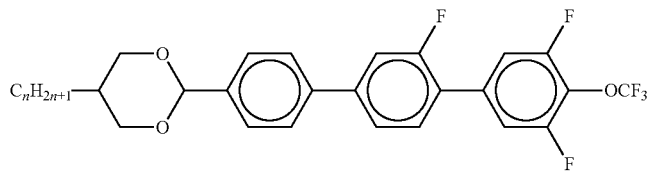
DPGU—n-OT
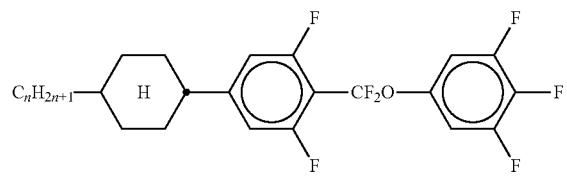
CUQU—n-F
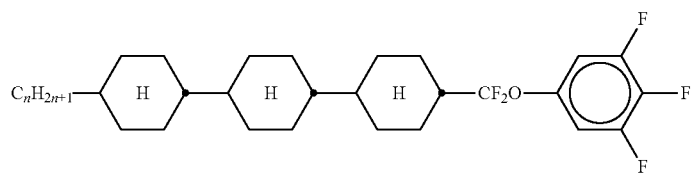
CCCQU—n-F
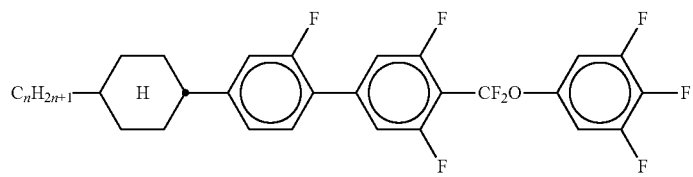
CGUQU—n-F
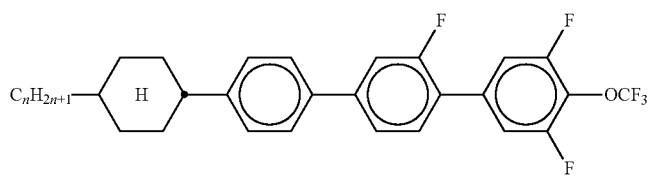
CPGU—n-OT
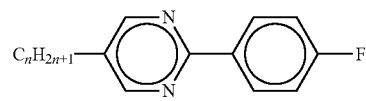
PYP—n-F
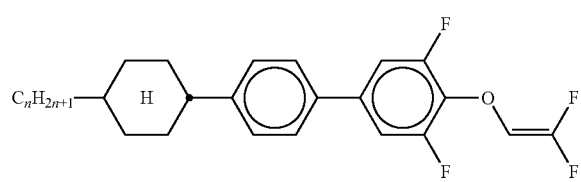
CPU—n-OXF TABLE B-continued
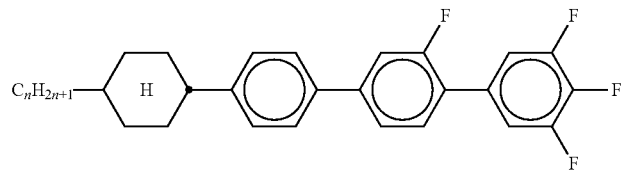
CPGU—n-F
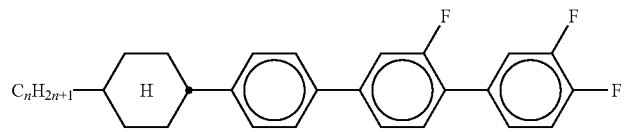
CPGG—n-F
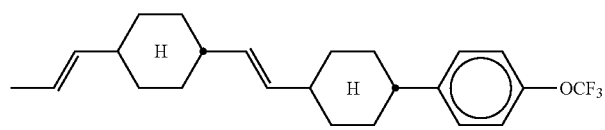
CVCP—1V—OT
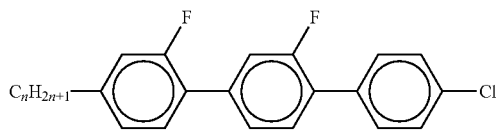
GGP—n-Cl
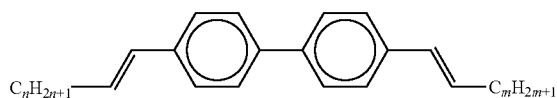
PP-nV—Vm
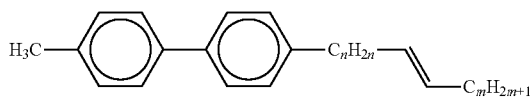
PP-1-nVm
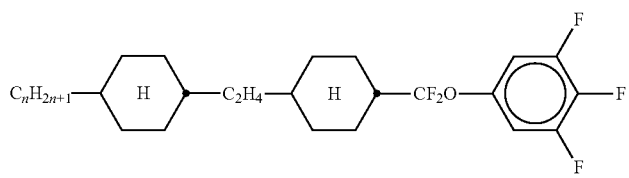
CWCQU—n-F
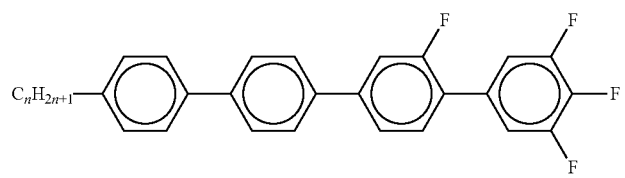
PPGU—n-F TABLE B-continued
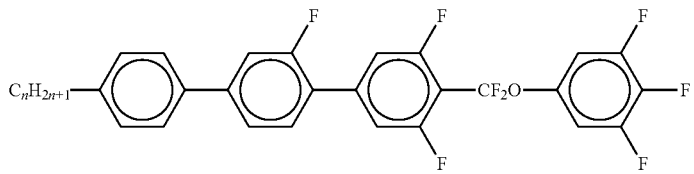
PGUQU—n-F
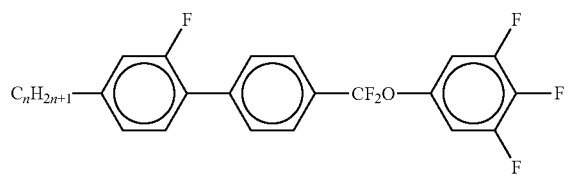
GPQU—n-F
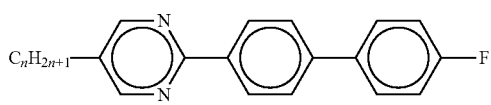
MPP—n-F
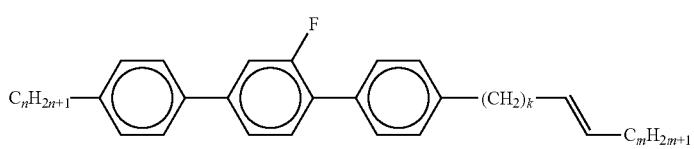
PGP-n-kVm
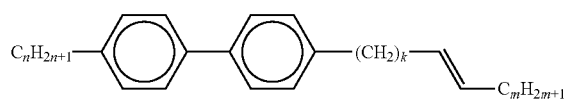
PP-n-kVm
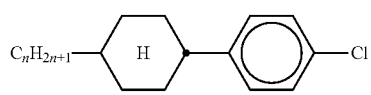
PCH-nCl
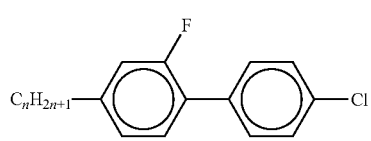
GP—n-Cl
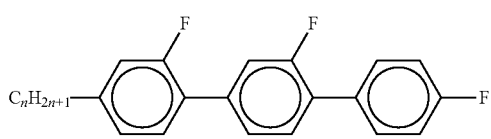
GGP—n-F
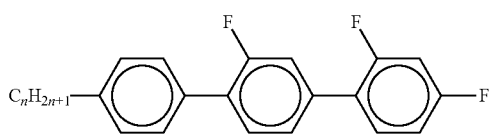
PGIGI—n-F TABLE B-continued
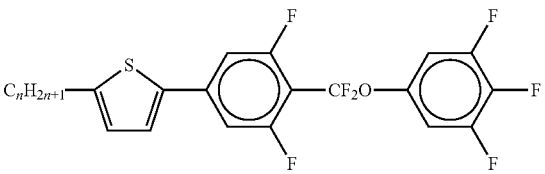
SUQU—n-F
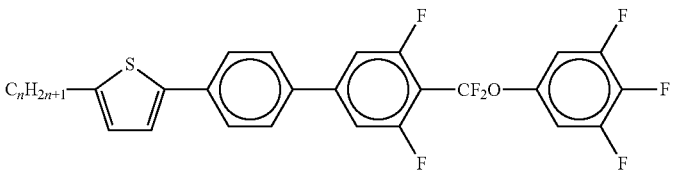
SPUQU—n-F
In a preferred embodiment of the present invention, the LC media according to the invention comprise one or more compounds selected from the group consisting of compounds from Tables A and B.
TABLE C
Table C indicates possible chiral dopants which can be added to the LC media according to the invention.
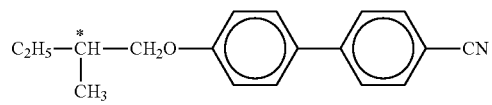
C 15
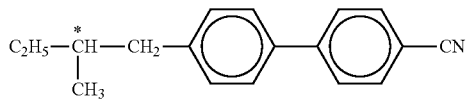
CB 15
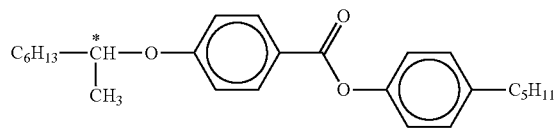
CM 21
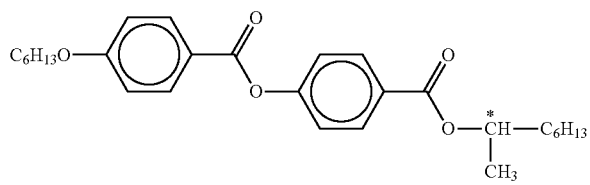
R/S-811
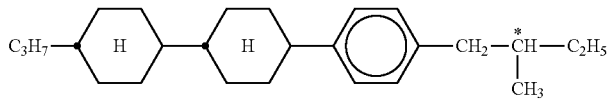
CM 44

TABLE C-continued
Table C indicates possible chiral dopants which can be added to the LC media according to the invention.
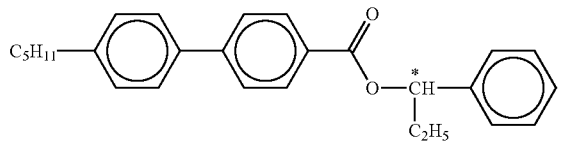
CM 45
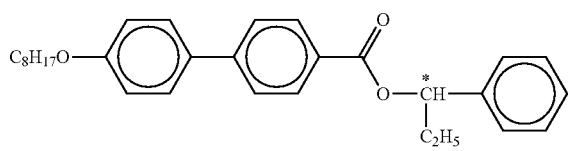
CM 47
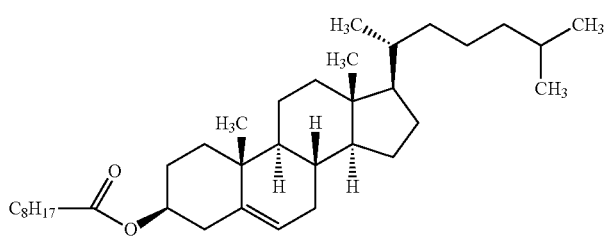
CN
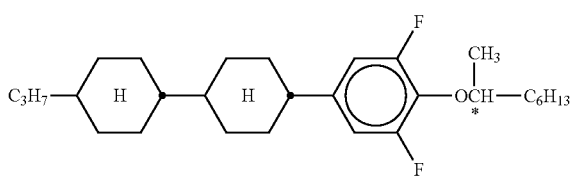
R/S-2011
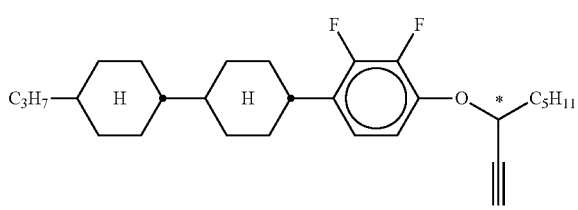
R/S-3011
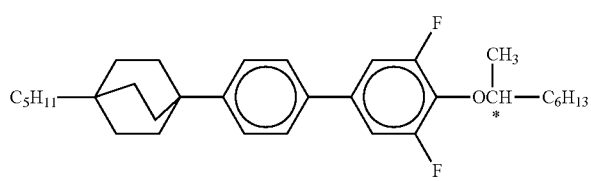
R/S-4011
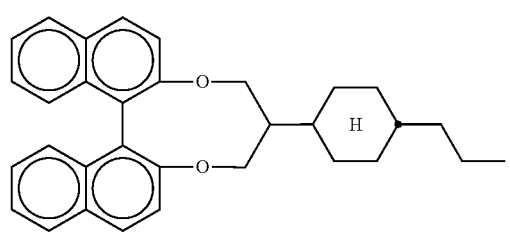

TABLE C-continued

Table C indicates possible chiral dopants which can be added to the LC media according to the invention.

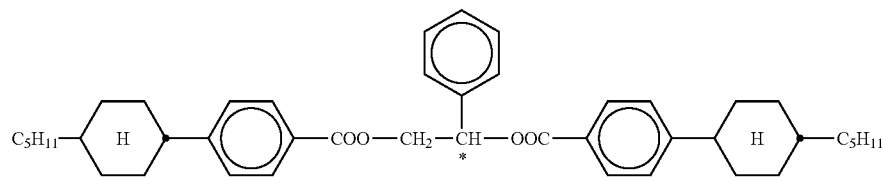

The LC media optionally comprise 0 to 10% by weight, in particular 0.01 to 5% by weight, particularly preferably 0.1 to 3% by weight, of dopants, preferably selected from the group consisting of compounds from Table C.

TABLE D

Table D indicates possible stabilisers which can be added to the LC media according to the invention.

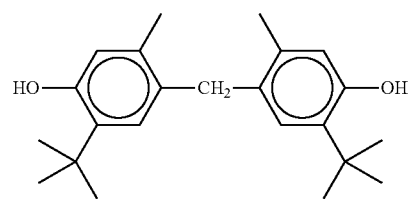

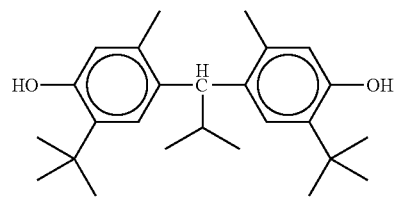

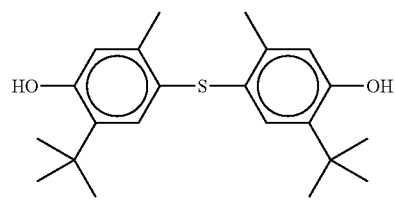

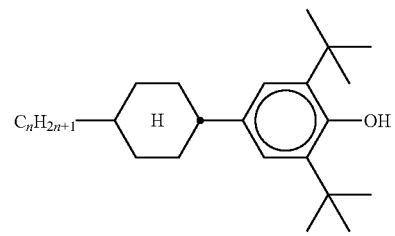

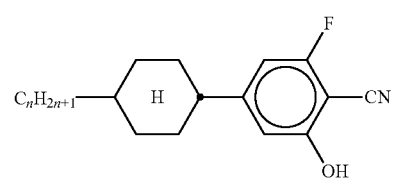

TABLE D-continued
Table D indicates possible stabilisers which can be added to the LC media according to the invention.
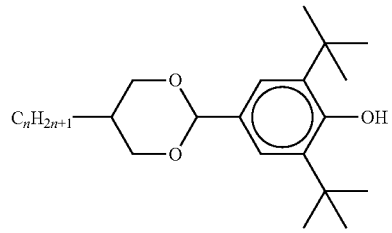
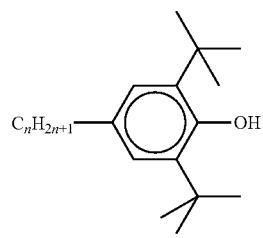
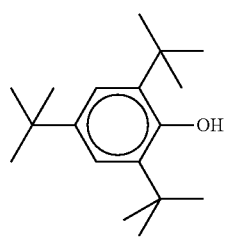
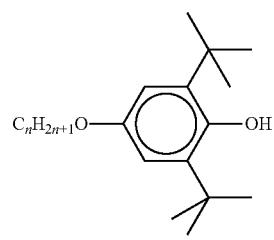
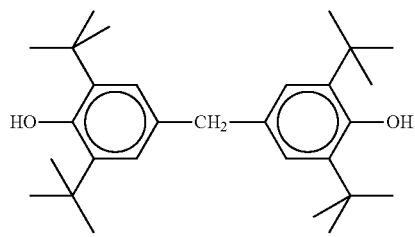
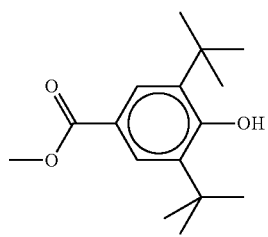

TABLE D-continued
Table D indicates possible stabilisers which can be added to the LC media according to the invention.
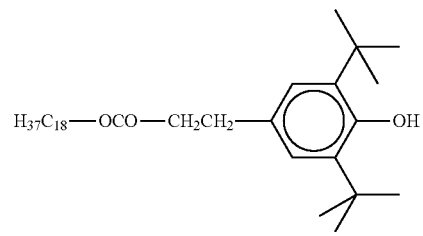
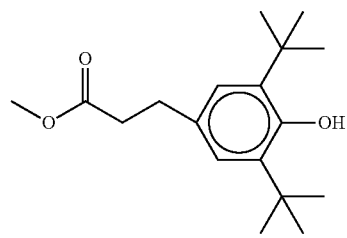
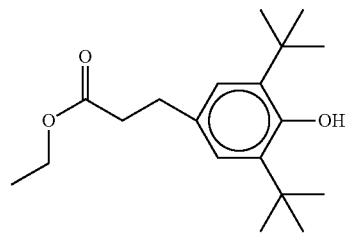
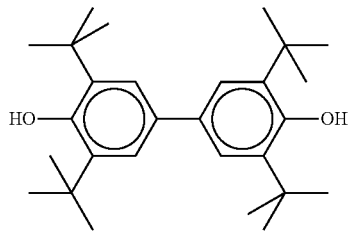
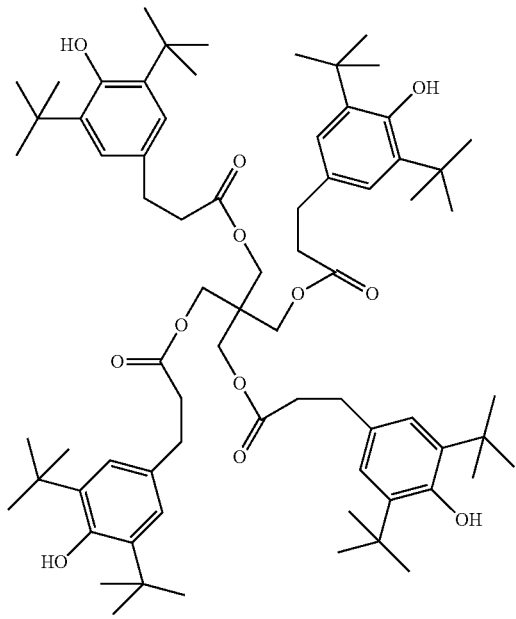 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
Table D indicates possible stabilisers which can be added to the LC media according to the invention.
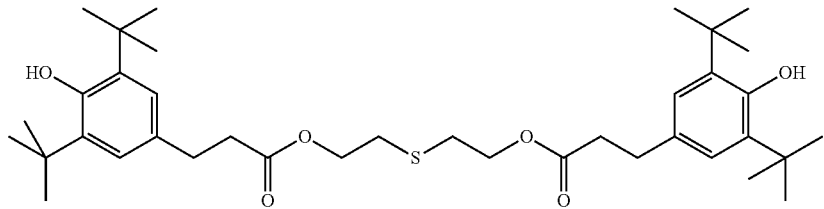 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
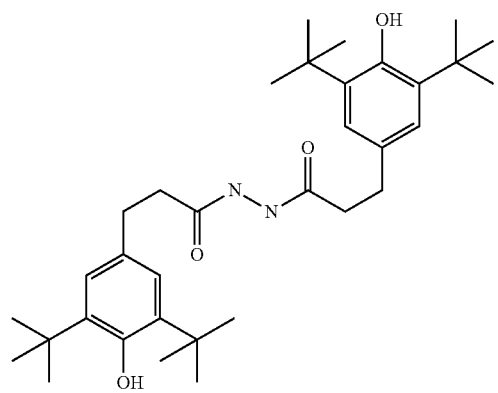 [SMILES: CC(C)(C)c1cc(CCC(=O)NNC(=O)CCc2cc(C(C)(C)C)c(O)c(C(C)(C)C)c2)cc(C(C)(C)C)c1O]
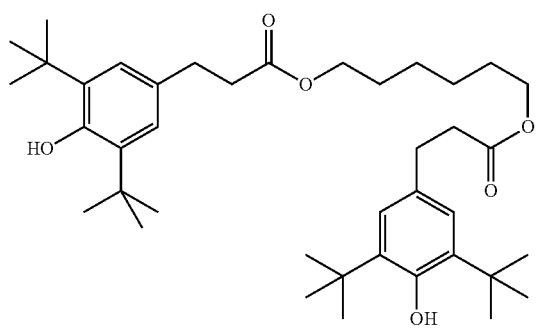 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
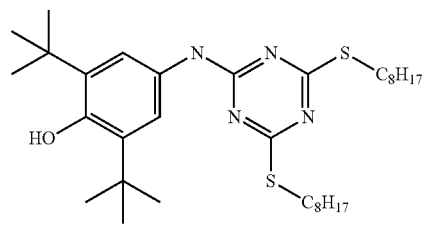

TABLE D-continued
Table D indicates possible stabilisers which can be added to the LC media according to the invention.
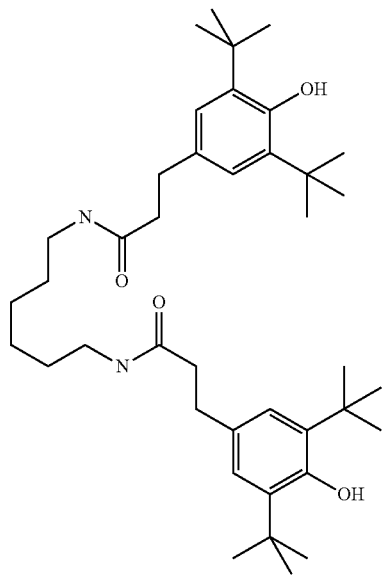 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
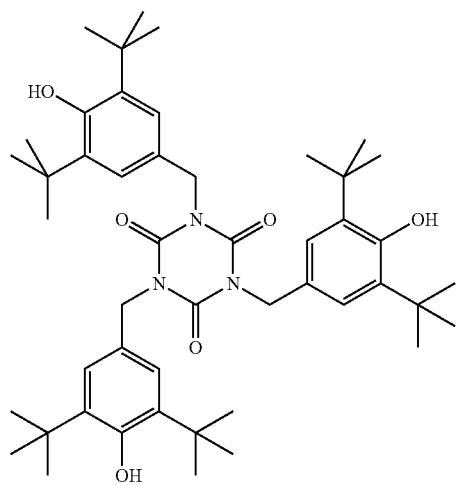 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
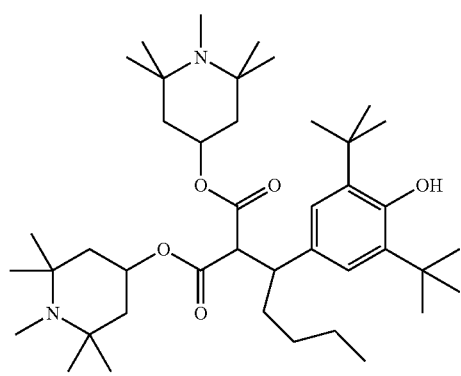 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
Table D indicates possible stabilisers which can be added to the LC media according to the invention.
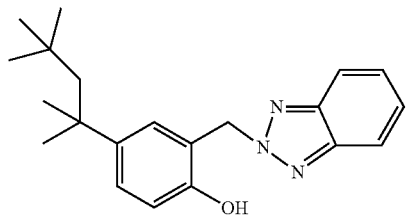 [SMILES: CC(C)(C)CC(C)(C)c1ccc(O)c(Cn2nc3ccccc3n2)c1]
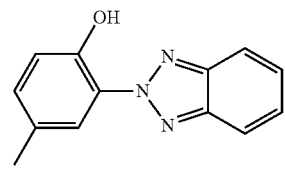 [SMILES: Cc1ccc(O)c(-n2nc3ccccc3n2)c1]
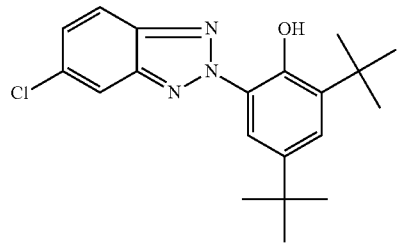 [SMILES: CC(C)(C)c1cc(-n2nc3ccc(Cl)cc3n2)c(O)c(C(C)(C)C)c1]
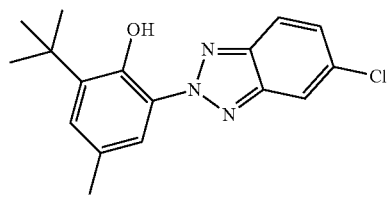 [SMILES: Cc1cc(-n2nc3ccc(Cl)cc3n2)c(O)c(C(C)(C)C)c1]
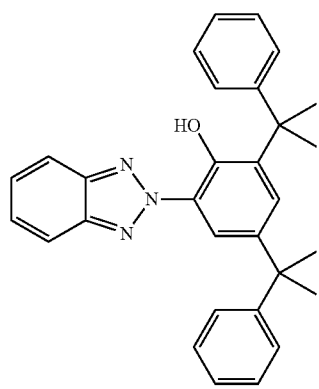 [SMILES: CC(C)(c1ccccc1)c1cc(-n2nc3ccccc3n2)c(O)c(C(C)(C)c2ccccc2)c1]
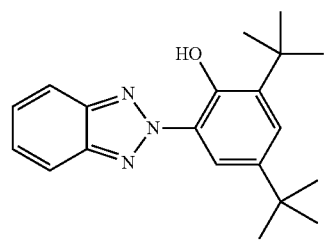 [SMILES: CC(C)(C)c1cc(-n2nc3ccccc3n2)c(O)c(C(C)(C)C)c1]

TABLE D-continued
Table D indicates possible stabilisers which can be added to the LC media according to the invention.
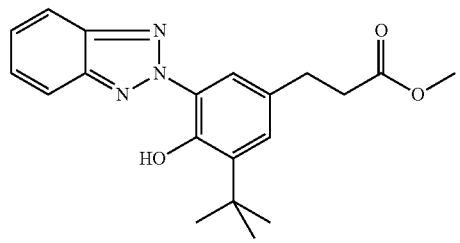 [SMILES: COC(=O)CCc1cc(-n2nc3ccccc3n2)c(O)c(C(C)(C)C)c1]
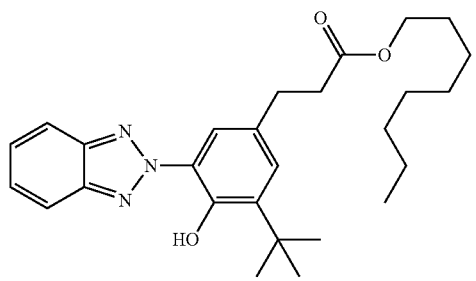 [SMILES: CCCCCCCCOC(=O)CCc1cc(-n2nc3ccccc3n2)c(O)c(C(C)(C)C)c1]
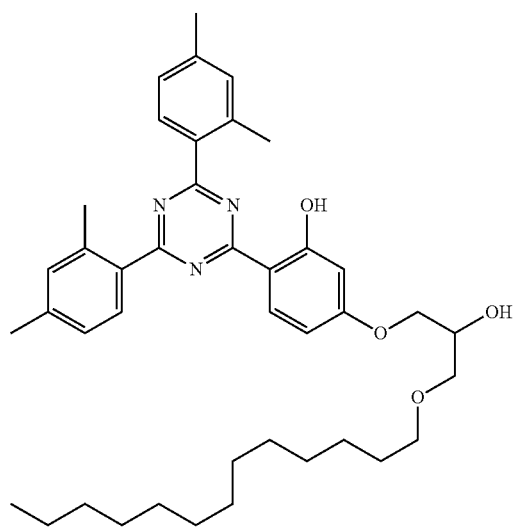 [SMILES: CCCCCCCCCCCCCOCC(O)COc1ccc(-c2nc(-c3ccc(C)cc3C)nc(-c3ccc(C)cc3C)n2)c(O)c1]
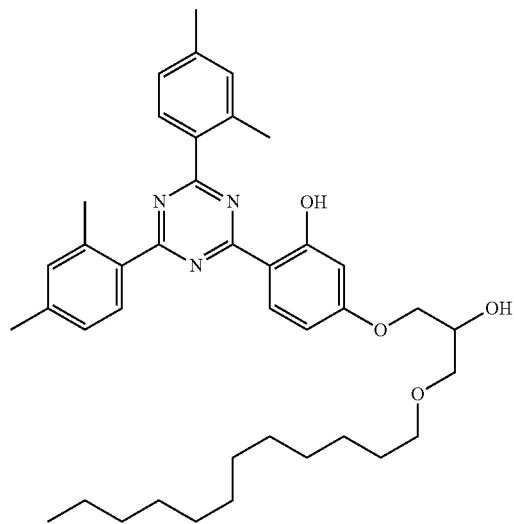 [SMILES: CCCCCCCCCCCCOCC(O)COc1ccc(-c2nc(-c3ccc(C)cc3C)nc(-c3ccc(C)cc3C)n2)c(O)c1]

TABLE D-continued

Table D indicates possible stabilisers which can be added to the LC media according to the invention.

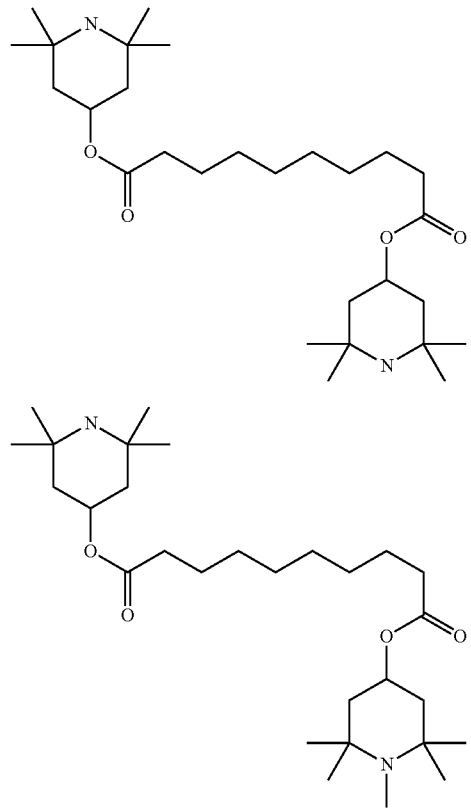

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

Table E shows illustrative compounds which can be used in the LC media in accordance with the present invention, preferably as reactive compounds.

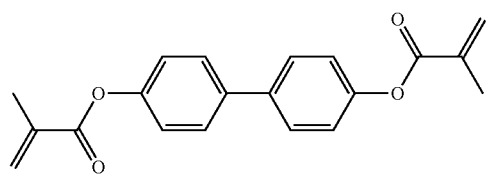 [SMILES: C=C(C)C(=O)Oc1ccc(-c2ccc(OC(=O)C(=C)C)cc2)cc1]

RM-1

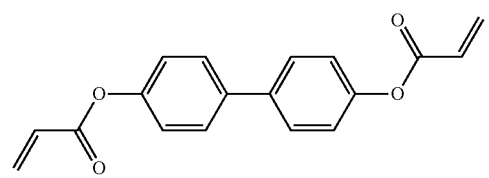 [SMILES: C=CC(=O)Oc1ccc(-c2ccc(OC(=O)C=C)cc2)cc1]

RM-2

TABLE E-continued
Table E shows illustrative compounds which can be used in the LC media
in accordance with the present invention, preferably as reactive compounds.
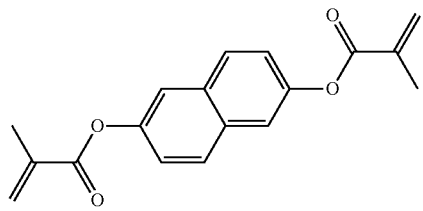 [SMILES: C=C(C)C(=O)Oc1ccc2cc(OC(=O)C(=C)C)ccc2c1]
RM-3
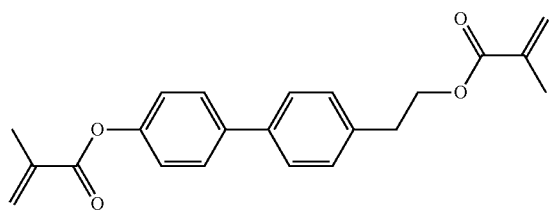 [SMILES: C=C(C)C(=O)OCCc1ccc(-c2ccc(OC(=O)C(=C)C)cc2)cc1]
RM-4
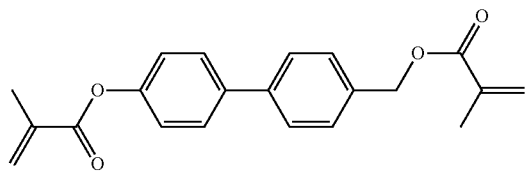 [SMILES: C=C(C)C(=O)OCc1ccc(-c2ccc(OC(=O)C(=C)C)cc2)cc1]
RM-5
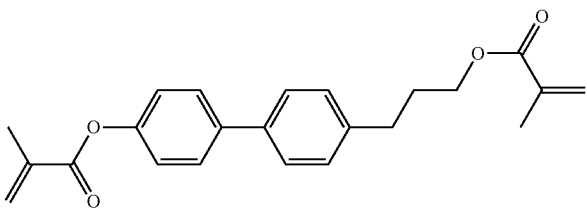 [SMILES: C=C(C)C(=O)OCCCc1ccc(-c2ccc(OC(=O)C(=C)C)cc2)cc1]
RM-6
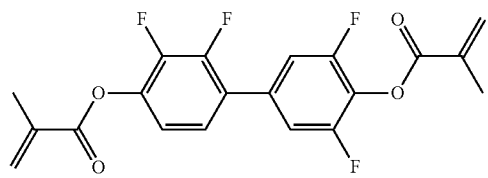 [SMILES: C=C(C)C(=O)Oc1ccc(-c2cc(F)c(OC(=O)C(=C)C)c(F)c2)c(F)c1F]
RM-7
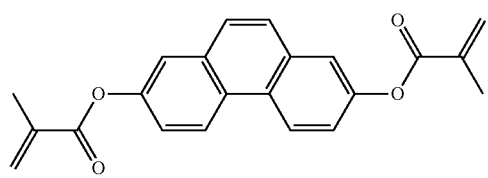 [SMILES: C=C(C)C(=O)Oc1ccc2c(ccc3cc(OC(=O)C(=C)C)ccc32)c1]
RM-8

TABLE E-continued
Table E shows illustrative compounds which can be used in the LC media
in accordance with the present invention, preferably as reactive compounds.
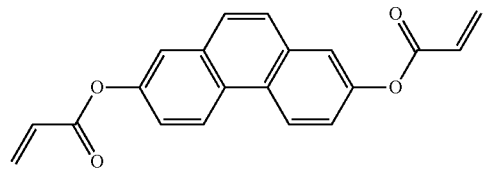 [SMILES: C=CC(=O)Oc1ccc2c(ccc3cc(OC(=O)C=C)ccc32)c1]
RM-9
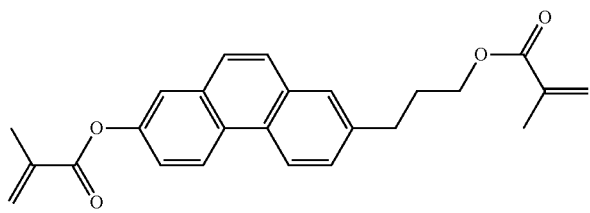 [SMILES: C=C(C)C(=O)OCCCc1ccc2c(ccc3cc(OC(=O)C(=C)C)ccc32)c1]
RM-10
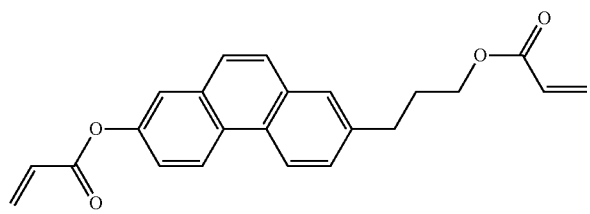 [SMILES: C=CC(=O)OCCCc1ccc2c(ccc3cc(OC(=O)C=C)ccc32)c1]
RM-11
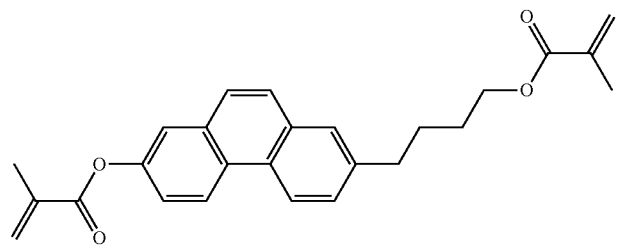 [SMILES: C=C(C)C(=O)OCCCCc1ccc2c(ccc3cc(OC(=O)C(=C)C)ccc32)c1]
RM-12
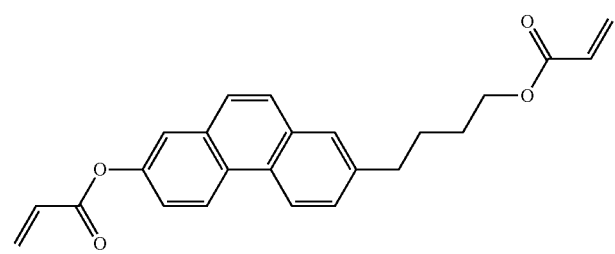 [SMILES: C=CC(=O)OCCCCc1ccc2c(ccc3cc(OC(=O)C=C)ccc32)c1]
RM-13
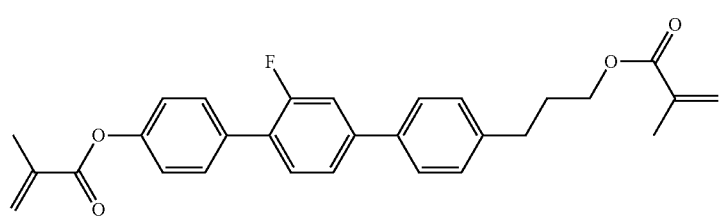 [SMILES: C=C(C)C(=O)OCCCc1ccc(-c2ccc(-c3ccc(OC(=O)C(=C)C)cc3)c(F)c2)cc1]
RM-14

TABLE E-continued
Table E shows illustrative compounds which can be used in the LC media
in accordance with the present invention, preferably as reactive compounds.
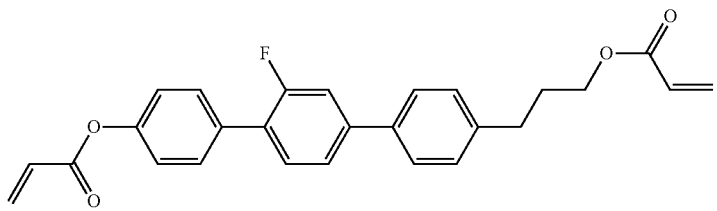 [SMILES: C=CC(=O)OCCCc1ccc(-c2ccc(-c3ccc(OC(=O)C=C)cc3)c(F)c2)cc1]
RM-15
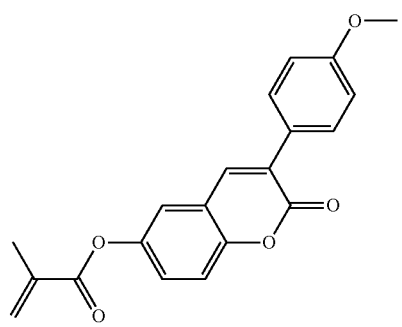 [SMILES: C=C(C)C(=O)Oc1ccc2oc(=O)c(-c3ccc(OC)cc3)cc2c1]
RM-16
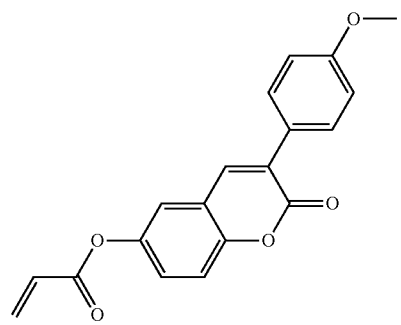 [SMILES: C=CC(=O)Oc1ccc2oc(=O)c(-c3ccc(OC)cc3)cc2c1]
RM-17
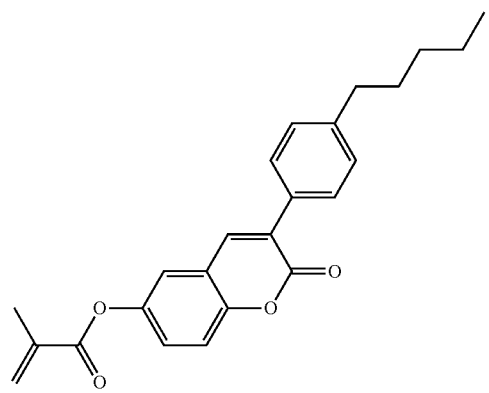 [SMILES: C=C(C)C(=O)Oc1ccc2oc(=O)c(-c3ccc(CCCCC)cc3)cc2c1]
RM-18

TABLE E-continued
Table E shows illustrative compounds which can be used in the LC media in accordance with the present invention, preferably as reactive compounds.
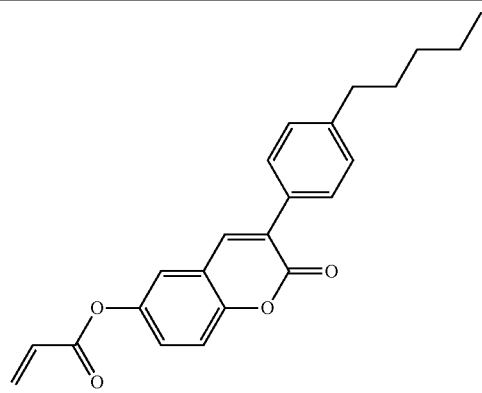
RM-19
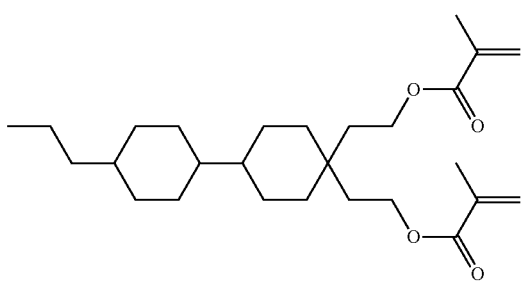 [SMILES: C=C(C)C(=O)OCCC1(CCOC(=O)C(=C)C)CCC(C2CCC(CCC)CC2)CC1]
RM-20
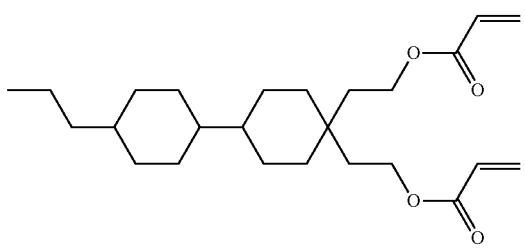 [SMILES: C=CC(=O)OCCC1(CCOC(=O)C=C)CCC(C2CCC(CCC)CC2)CC1]
RM-21
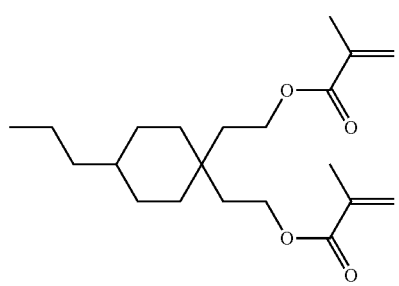 [SMILES: C=C(C)C(=O)OCCC1(CCOC(=O)C(=C)C)CCC(CCC)CC1]
RM-22
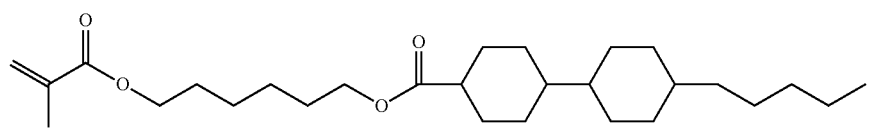 [SMILES: C=C(C)C(=O)OCCCCCCOC(=O)C1CCC(C2CCC(CCCCC)CC2)CC1]
RM-23

TABLE E-continued
Table E shows illustrative compounds which can be used in the LC media
in accordance with the present invention, preferably as reactive compounds.
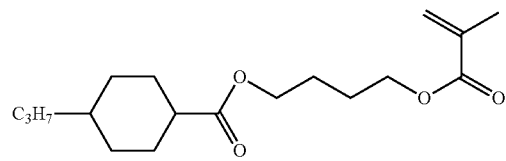
RM-24
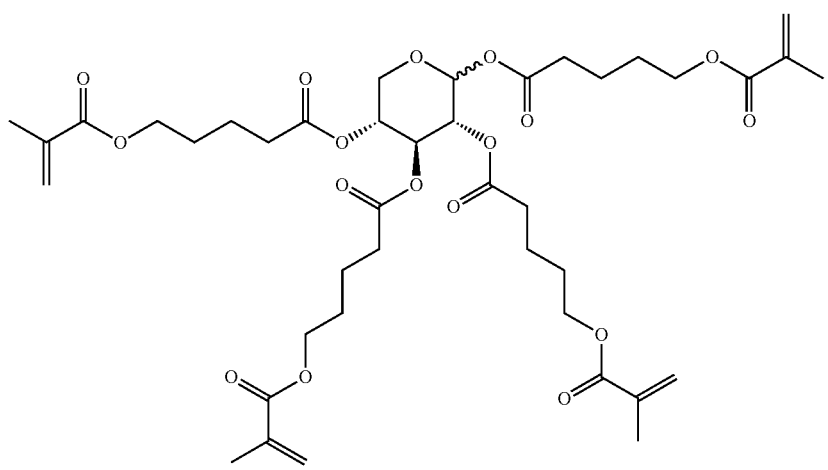 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-25
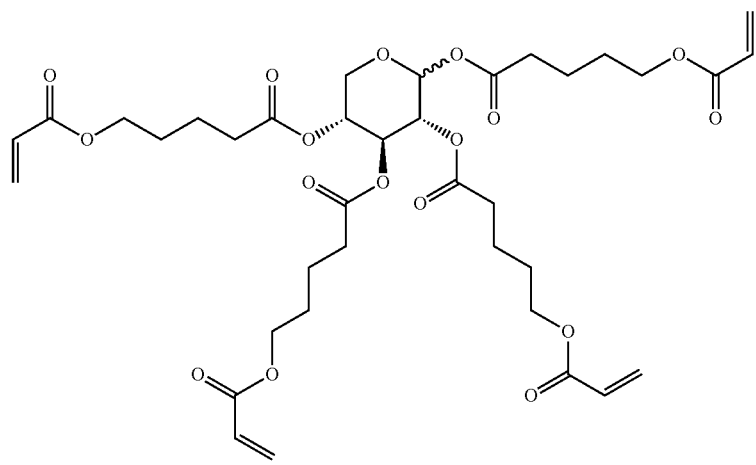 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-26

TABLE E-continued

Table E shows illustrative compounds which can be used in the LC media in accordance with the present invention, preferably as reactive compounds.

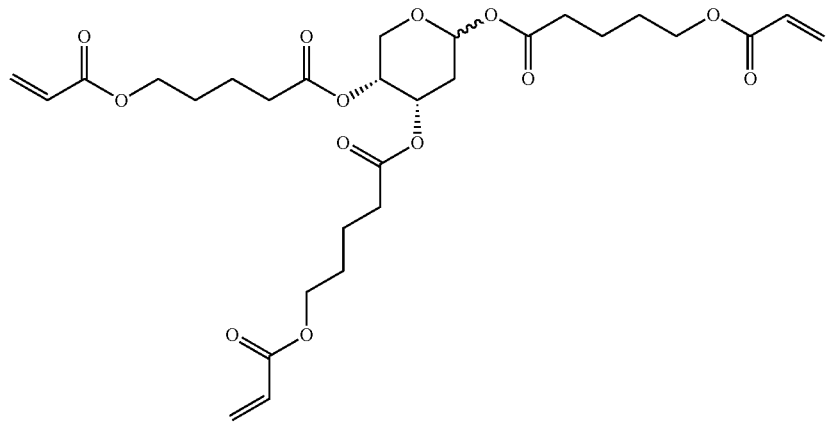 [SMILES: C=CC(=O)OCCCCC(=O)OC1C[C@H](OC(=O)CCCCOC(=O)C=C)[C@H](OC(=O)CCCCOC(=O)C=C)CO1]

RM-27

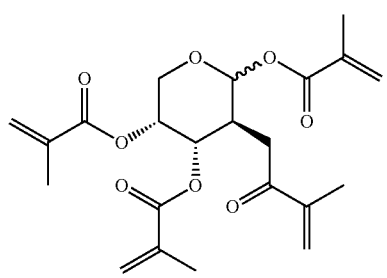 [SMILES: C=C(C)C(=O)C[C@@H]1C(OC(=O)C(=C)C)OC[C@@H](OC(=O)C(=C)C)[C@H]1OC(=O)C(=C)C]

RM-28

In a preferred embodiment of the present invention, the mesogenic media comprise one or more compounds selected from the group of the compounds from Table E.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
$\Delta\epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ at 1 kHz, unless explicitly indicated otherwise in each case.

The polymerisable compounds are polymerised in the display or test cell by irradiation with UVA light (usually 365 nm) of defined intensity for a prespecified time, with a voltage optionally being applied simultaneously to the display (usually 10 to 30 V alternating current, 1 kHz). In the examples, unless indicated otherwise, a 100 mW/cm² mercury vapour lamp is used, and the intensity is measured using a standard UV meter (Ushio UNI meter) fitted with a 320 nm band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the Claims.

EXAMPLES

The compounds employed, if not commercially available, are synthesised by standard laboratory procedures. LC media originate from Merck KGaA, Germany. PSS-1 ([3-(2-aminoethyl)amino]propyl-heptaisobutyl-substituted PSS; CAS Registry No. 444315-16-6) was purchased from Aldrich. Structures PSS-1 to PSS-9 and RM-1 are given in the preceding description.

Example 1

A polymerisable compound (RM-1, 1.0% by weight) and the diamine compound PSS-1 (0.25% by weight) are added to a nematic LC medium (Δ∈>0) in accordance with Table 1 and homogenised.

TABLE 1

| Nematic LC medium | | | |
|---|---|---|---|
| PGU-2-F | 3.5% | Cl.p. | +77.0 |
| PGU-3-F | 7.0% | Δn | 0.105 |
| CC-3-V1 | 15.0% | Δε | 7.2 |
| CC-4-V | 18.0% | ε$_\parallel$ | 10.3 |
| CC-5-V | 20.0% | K$_3$/K$_1$ | 0.88 |
| CCP-V-1 | 6.0% | γ$_1$ | 63 |
| APUQU-3-F | 15.0% | | |
| PUQU-3-F | 5.5% | | |
| PGP-2-4 | 3.0% | | |
| BCH-32 | 7.0% | | |

Use in test cells with no pre-alignment layer:
The resultant mixture is introduced into a test cell (with no polyimide alignment layer, layer thickness d≈10 μm, ITO interdigital electrodes arranged on a substrate surface, glass on the opposite substrate surface, no passivation layer). The LC medium has spontaneous homeotropic (vertical) alignment to the substrate surfaces. The cell is irradiated with UV light of intensity 100 mW/cm$^2$ for 6 min with application of a voltage (5 V). This causes polymerisation of the monomeric compound, and the pretilt of the cell can be changed. This alignment remains stable up to 70° C. The cell can be switched reversibly in the temperature-stable range by application of a voltage of between 0 and 50 V.

Example 2

Only the diamine compound PSS-1 (0.25% by weight) used previously is added to a nematic LC medium in accordance with Table 1 and homogenised.

Use in test cells with no pre-alignment layer:
The resultant mixture is introduced into a test cell (with no polyimide alignment layer, layer thickness d≈10 μm, ITO interdigital electrodes arranged on a substrate surface, glass on the opposite substrate surface, no passivation layer). The LC medium has spontaneous homeotropic (vertical) alignment to the substrate surfaces.

The homeotropic pre-alignment observed at room temperature disappears from a temperature of about 45° C. or more. Planar alignment is obtained. The cell continues to be switchable, but no longer as a VA-IPS, but instead as an IPS switching operation.

The invention claimed is:
1. A liquid-crystal medium comprising:
a low-molecular-weight liquid-crystalline component having positive dielectric anisotropy with a value Δ∈≤1.5, and
a component (N) comprising particles having a mass of at least 450 Da, where the particles contain one or more organic polar anchor groups.
2. The liquid-crystal medium according to claim 1, wherein said medium further comprises a polymerizable or polymerized component, where the polymerized component is obtainable by polymerization of a polymerizable component.
3. The liquid-crystal medium according to claim 1, said particles are dissolved particles.
4. The liquid-crystal medium according to claim 1, wherein the particles of component (N) have a side ratio $d_{max}/d_{min}$ of at most 3:1.
5. The liquid-crystal medium according to claim 1, wherein the particles of component (N) are organic molecules.
6. The liquid-crystal medium according to claim 1, wherein the particles of component (N) are organic/inorganic hybrid particles.
7. The liquid-crystal medium according to claim 1, wherein component (N) comprises silsesquioxane compounds.
8. The liquid-crystal medium according to claim 1, wherein the particles of component (N) have been functionalized by one or more anchor groups containing at least one or more heteroatoms selected from the elements N, O, S and P.
9. The liquid-crystal medium according to claim 1, wherein component (N) has been functionalized by an anchor group comprising a group of the sub-formula

-Sp-[X$^2$—Z$^2$—]$_k$X$^1$     (A1), in which, in each case independently,
Sp denotes a spacer group or a single bond via which a connection to the particle is formed,
X$^1$ denotes a group —NH$_2$, —NHR$^1$, —NR$^1{}_2$, —CN, —OR$^1$, —OH, —(CO)OH, or a group of the formula

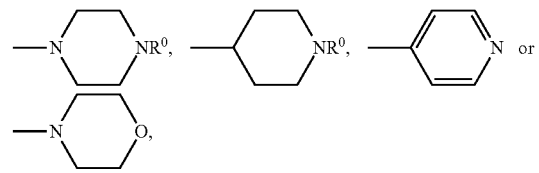

R$^0$ denotes H or alkyl having 1 to 12 C atoms,
X$^2$ in each case independently denotes —NH—, —NR$^1$—, —O— or a single bond,
Z$^2$ in each case independently denotes an alkylene group having 1-15 C atoms, carbocyclic rings having 5 or 6 C atoms, or combinations of one or more rings and alkylene groups, in each of which one or more hydrogen atoms are each optionally replaced by —OH, OR$^1$, —NH$_2$, —NHR$^1$—, —NR$^1{}_2$ or halogen,
R$^1$ in each case independently denotes a halogenated or unsubstituted alkyl radical having 1 to 15 C atoms, where, in addition, one or more CH$_2$ groups in this radical may each be replaced, independently of one another, by —C≡C—, —CH═CH—, —(CO)O—, —O(CO)—, —(CO)— or —O— in such a way that O and N atoms are not linked directly to one another, and where the groups R$^1$ may be linked to one another to form ring systems, and
k denotes 0 to 3.
10. The liquid-crystal medium according to claim 1, wherein the particles of component (N) each have precisely one anchor group.
11. The liquid-crystal medium according to claim 1, wherein said medium contains particles of component (N) in a concentration of less than 10% by weight.

12. The liquid-crystal medium according to claim 2, wherein the polymerizable component comprises a compound of the formula I:

$$P^a\text{-}(Sp^a)_{s1}\text{-}A^2\text{-}(Z^1\text{-}A^1)_n\text{-}(Sp^b)_{s2}\text{-}P^b \qquad I$$

in which the individual radicals have the following meanings:

$P^a$, $P^b$ each, independently of one another, denote a polymerizable group, $Sp^a$, $Sp^b$ on each occurrence, identically or differently, denote a spacer group, s1, s2 each, independently of one another, denote 0 or 1, $A^1$, $A^2$ each, independently of one another, denote a radical selected from the following groups:
  a) trans-1,4-cyclohexylene, 1,4-cyclo-hexenylene, or 4,4'-bicyclohexylene, in which, in addition, one or more non-adjacent $CH_2$ groups are each optionally replaced by —O— or —S— and in which, in addition, one or more H atoms are each optionally replaced by F,
  b) 1,4-phenylene or 1,3-phenylene, in which, in addition, one or two CH groups are each optionally replaced by N and in which, in addition, one or more H atoms are each optionally replaced by L,
  c) tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl, or selenophene-2,5-diyl, each of which is unsubstituted or mono- or polysubstituted by L,
  d) saturated, partially unsaturated or fully unsaturated, and optionally substituted, polycyclic radicals having 5 to 20 cyclic C atoms, one or more of which may, in addition, each be replaced by heteroatoms where, in addition, one or more H atoms in these radicals may each be replaced by L, and/or one or more double bonds may each be replaced by single bonds, and/or one or more CH groups may each be replaced by N, n denotes 0, 1, 2 or 3, $Z^1$ in each case, independently of one another, denotes —CO—O—, —O—CO—, —$CH_2$O—, —O$CH_2$—, —$CF_2$O—, —O$CF_2$—, or —$(CH_2)_n$—, where n is 2, 3 or 4, —O—, —CO—, —$C(R^yR^z)$—, —$CH_2CF_2$—, —$CF_2CF_2$— or a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkyl-carbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may each be replaced by F, M denotes —O—, —S—, —$CH_2$—, —$CHY^1$— or —$CY^1Y^2$—, and $Y^1$ and $Y^2$ each, independently of one another, have one of the meanings indicated above for $R^0$ or denote Cl or CN.

13. The liquid-crystal medium according to claim 1, wherein component (N) comprises particles which contain one or more polymerizable groups.

14. A liquid-crystal display comprising:
an liquid-crystal cell having two substrates and at least two electrodes, where at least one substrate is transparent to light and at least one substrate has one or two electrodes, and a layer of an liquid-crystal medium according to claim 1 located between the substrates, where component (N) is suitable for effecting homeotropic alignment of the liquid-crystal medium with respect to the substrate surfaces.

15. A liquid-crystal display according to claim 14, wherein the substrates have no alignment layers.

16. A liquid-crystal display according to claim 14, wherein it is a VA display having interdigital electrodes arranged on one or both sides of the liquid-crystal cell.

17. A process for the preparation of an liquid-crystal medium according to claim 1, said process comprising:
mixing a low-molecular-weight liquid-crystalline component having positive dielectric anisotropy with a value $\Delta\epsilon \leq 1.5$, and a component (N) comprising particles having a mass of at least 450 Da, where the particles contain one or more organic polar anchor groups, and
optionally adding polymerizable compounds and/or assistants.

18. The liquid-crystal medium according to claim 1, wherein said particles are dispersed particles.

19. The liquid-crystal medium according to claim 2, wherein the polymerizable component comprises a compound of the formula I:

$$P^a\text{-}(Sp^a)_{s1}\text{-}A^2\text{-}(Z^1\text{-}A^1)_n\text{-}(Sp^b)_{s2}\text{-}P^b \qquad I$$

in which the individual radicals have the following meanings:

$P^a$, $P^b$ each, independently of one another, denote a polymerizable group, $Sp^a$, $Sp^b$ on each occurrence, identically or differently, denote a spacer group, s1, s2 each, independently of one another, denote 0 or 1, $A^1$, $A^2$ each, independently of one another, denote a radical selected from the following groups:
  a) trans-1,4-cyclohexylene, 1,4-cyclohexenylene, or 4,4'-bicyclohexylene, in which, in addition, one or more non-adjacent $CH_2$ groups are each optionally replaced by —O— or —S— and in which, in addition, one or more H atoms are each optionally replaced by F,
  b) 1,4-phenylene or 1,3-phenylene, in which, in addition, one or two CH groups are each optionally replaced by N and in which, in addition, one or more H atoms are each optionally replaced by L,
  c) tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl, or selenophene-2,5-diyl, each of which is unsubstituted or mono- or polysubstituted by L,
  d) bicyclo[1.1.1]pentane-1,3-diyl, bicyclo[2.2.2]octane-1,4-diyl, spiro[3.3]heptane-2,6-diyl,

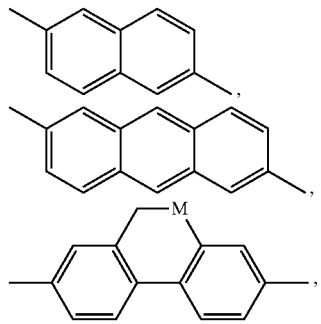

-continued

[chemical structures]

where, in addition, one or more H atoms in these radicals may each be replaced by L, and/or one or more double bonds may each be replaced by single bonds, and/or one or more CH groups may each be replaced by N, n denotes 0, 1, 2 or 3, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^y$R$^z$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkyl-carbonyloxy or alkoxycarbonyloxy having 1 to 12 C atoms, R$^0$, R$^{00}$ each, independently of one another, denote H, F or straight-chain or branched alkyl having 1 to 12 C atoms, in which, in addition, one or more H atoms may each be replaced by F, M denotes —O—, —S—, —CH$_2$—, —CHY$^1$—or -CY$^1$Y$^2$—, and Y$^1$ and Y$^2$ each, independently of one another, have one of the meanings indicated above for R$^0$ or denote Cl or CN.

20. The liquid-crystal medium according to claim 4, wherein said particles have a diameter of 1-5 nm.

21. The liquid-crystal medium according to claim 1, wherein the amount of said particles is 0.1 to 0.5% by weight.

22. The liquid-crystal medium according to claim 1, wherein said particles of component (N) are of the formula:

O-A*, wherein

A* denotes a polar anchor group, and

O stands for the remainder of the particle without the anchor group wherein O is ≤90% of the mass of the particle, and wherein anchor group A* is a group of the formula -Sp-[X$^2$—Z$^2$—]$_k$X$^1$    (A1), in which, in each case independently, Sp denotes a single bond or a spacer group via which a connection to the particle is formed, X$^1$ denotes a group —NH$_2$, —NHR$^1$, —NR$^1$$_2$, —CN, —OR$^1$, —OH, —(CO)OH, or a group of the formula

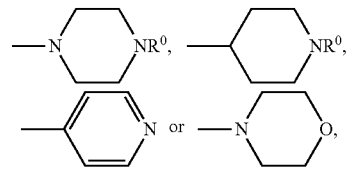

R$^0$ denotes H or alkyl having 1 to 12 C atoms,

X$^2$ in each case independently denotes —NH—, —NR$^1$—, —O— or a single bond,

Z$^2$ in each case independently denotes an alkylene group having 1-15 C atoms, carbocyclic rings having 5 or 6 C atoms, or combinations of one or more rings and alkylene groups, in each of which one or more hydrogen atoms are each optionally replaced by —OH, OR$^1$, —NH$_2$, —NHR$^1$—, —NR$^1$$_2$ or halogen, R$^1$ in each case independently denotes a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)— or —O— in such a way that O and N atoms are not linked directly to one another, and where the groups R$^1$ may optionally be linked to one another to form ring systems, and k denotes 0 to 3.

23. The liquid-crystal medium according to claim 22, wherein anchor group A* contains a radical of the sub-formula (A2)

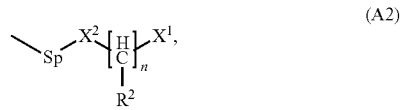

in which Sp, X$^1$, X$^2$ and R$^1$ are as defined above for formula (A1), and

R$^2$ denotes H, F, Cl, CN, —OH, —NH$_2$, or a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)—, —O—, —NH— or —NR¹—
in such a way that O and N atoms are not linked directly to one another, and n denotes 1, 2 or 3.

24. The liquid-crystal medium according to claim 22, wherein anchor groups A* are selected from —NH$_2$, —NH—(CH$_2$)$_{n3}$H, —(CH$_2$)$_n$—NH$_2$, —(CH$_2$)$_n$—NH—(CH$_2$)$_{n3}$H, —NH—(CH$_2$)$_n$—NH$_2$, —NH—(CH$_2$)$_n$—NH—(CH$_2$)$_{n3}$H, —(CH$_2$)$_{n1}$—NH—(CH$_2$)$_{n2}$—NH$_2$, —(CH$_2$)$_{n1}$—NH—(CH$_2$)$_{n2}$—NH—(CH$_2$)$_{n3}$H, —O—(CH$_2$)$_n$—NH$_2$, —(CH$_2$)$_{n1}$—O—(CH$_2$)$_n$—NH$_2$, —(CH$_2$)$_{n1}$—NH—(CH$_2$)$_{n2}$—OH, —O—(CH$_2$)$_{n1}$—NH—(CH$_2$)$_{n2}$—NH$_2$, —O—(CH$_2$)$_{n1}$—NH—(CH$_2$)$_{n2}$—OH, and —(CH$_2$)$_{n1}$—NH—(CH$_2$)$_{n2}$—NH—(CH$_2$)$_{n3}$H, wherein n, n1, n2 and n3 each denote, independently, 1, 2, 3, 4, 5, 6, 7, 8, 9, 10, 11 or 12.

25. The liquid-crystal medium according to claim 22, wherein anchor groups A* are selected from —OH, —(CH$_2$)$_n$—OH, —O—(CH$_2$)$_n$—OH, —[O—(CH$_2$)$_{n1}$—]$_{n2}$—OH, —(CO)OH, —(CH$_2$)$_n$—(CO)OH, —O—(CH$_2$)$_n$—(CO)OH, and —[O—(CH$_2$)$_{n1}$—]$_{n2}$—(CO)OH, in which n, n1 and n2 denote, independently, 1, 2, 3, 4, 5, 6, 7, 8, 9, 10, 11 or 12.

26. The liquid-crystal medium according to claim 1, wherein the particles of component (N) are selected from the following compounds:

PSS-1

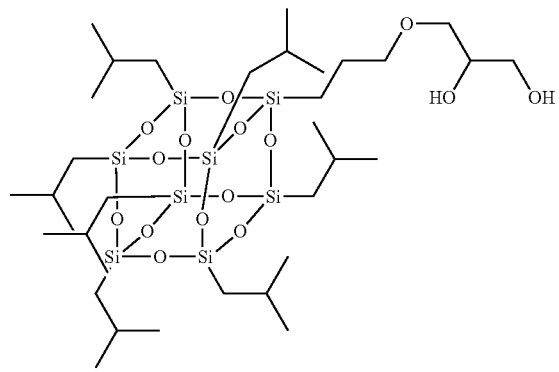

PSS-2

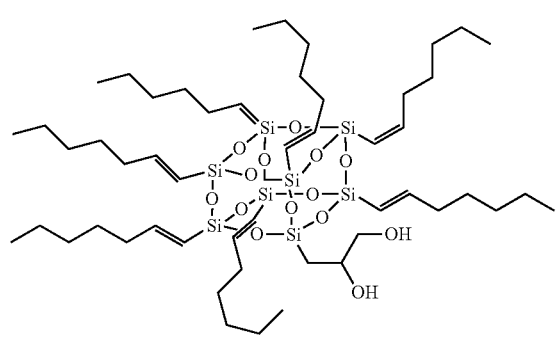

PSS-3

PSS-4

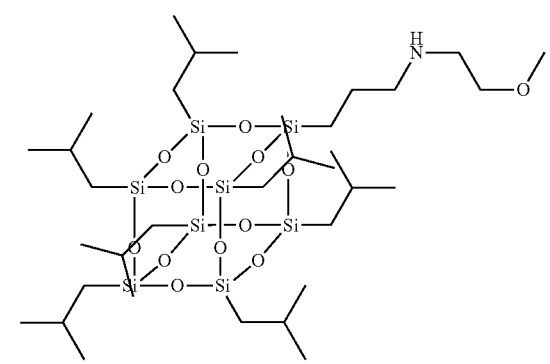

PSS-5

PSS-6

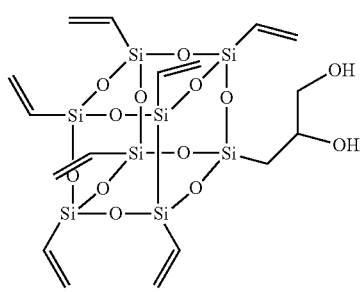

PSS-7
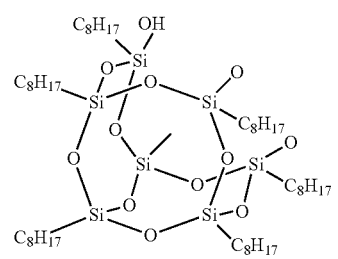
PSS-8
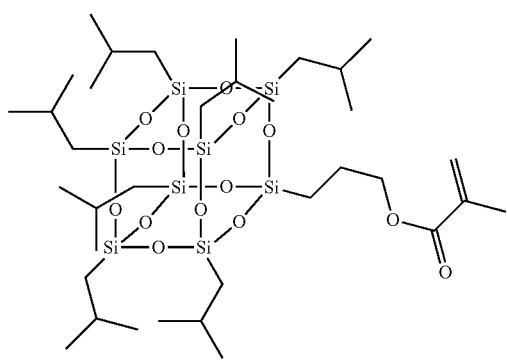
PSS-9
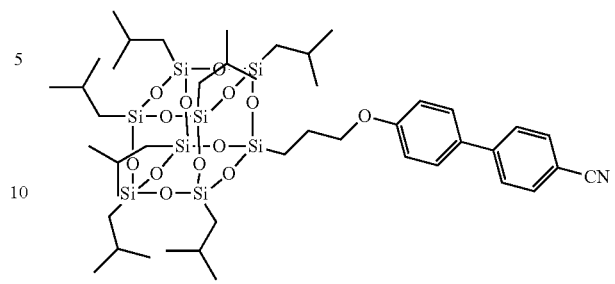
PSS-10
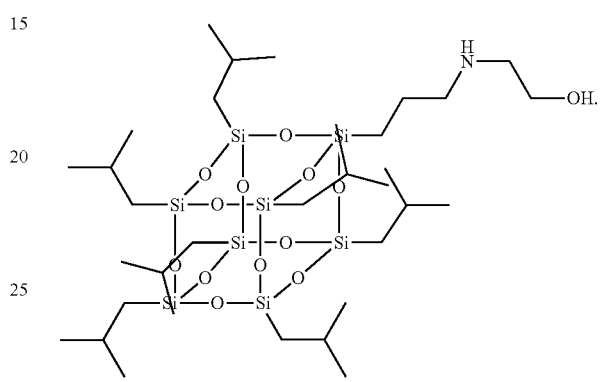
27. The liquid-crystal medium according to claim 1, wherein said liquid-crystal medium has a positive dielectric anisotropy.
* * * * *